US008453086B2

(12) United States Patent
Tung et al.

(10) Patent No.: US 8,453,086 B2
(45) Date of Patent: May 28, 2013

(54) SYSTEM AND METHOD FOR ANALYZING POWER CONSUMPTION OF ELECTRONIC DESIGN UNDERGOING EMULATION OR HARDWARE BASED SIMULATION ACCELERATION

(75) Inventors: Tung-Sun Tung, Cupertino, CA (US); Tsair-Chin Lin, Saratoga, CA (US); Bing Zhu, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 605 days.

(21) Appl. No.: 11/422,314

(22) Filed: Jun. 5, 2006

(65) Prior Publication Data
US 2006/0277509 A1 Dec. 7, 2006

Related U.S. Application Data

(60) Provisional application No. 60/687,021, filed on Jun. 3, 2005.

(51) Int. Cl.
*G06F 17/50* (2006.01)

(52) U.S. Cl.
USPC .......................................... 716/109; 716/133

(58) Field of Classification Search
USPC . 716/4–6, 16, 17, 109, 133; 702/108; 703/23, 703/15
See application file for complete search history.

(56) References Cited

U.S. PATENT DOCUMENTS

| | | | | |
|---|---|---|---|---|
| 5,521,834 A * | 5/1996 | Crafts et al. | | 716/6 |
| 5,535,370 A * | 7/1996 | Raman et al. | | 703/15 |
| 5,692,160 A | 11/1997 | Sarin et al. | | |
| 6,212,665 B1 * | 4/2001 | Zarkesh et al. | | 716/4 |
| 6,832,361 B2 * | 12/2004 | Cohn et al. | | 716/6 |
| 7,007,256 B2 * | 2/2006 | Sarkar et al. | | 716/6 |
| 7,035,785 B2 * | 4/2006 | Grochowski et al. | | 703/18 |
| 7,072,818 B1 * | 7/2006 | Beardslee et al. | | 703/14 |
| 7,236,920 B2 * | 6/2007 | Grochowski et al. | | 703/18 |
| 7,315,826 B1 * | 1/2008 | Guheen et al. | | 705/7 |
| 7,506,286 B2 * | 3/2009 | Beardslee et al. | | 716/4 |
| 2002/0162084 A1 * | 10/2002 | Butts et al. | | 716/17 |
| 2003/0131325 A1 * | 7/2003 | Schubert et al. | | 716/4 |
| 2003/0208733 A1 * | 11/2003 | Sokolov | | 716/4 |

(Continued)

FOREIGN PATENT DOCUMENTS

EP              1205861 A            5/2002

OTHER PUBLICATIONS

Coburn J. et al: "Hardware Accelerated Power Estimation" Design, Automation and Test in Europe, 2005. Proceedings Munich, Germany 07-11, Mar. 7, 2005, Piscataway, NJ, USA, IEEE, pp. 528-529.

(Continued)

*Primary Examiner* — Vuthe Siek
(74) *Attorney, Agent, or Firm* — Dickstein Shapiro LLP

(57) ABSTRACT

The invention described here is the methods of using a hardware-based functional verification system to mimic a design under test (DUT), under intended application environment and software, to record or derive the transition activities of all circuits of the DUT, then calculate the total or partial power consumption during the period of interest. The period of interest is defined by the user in terms of "events" which are the arbitrary states of the DUT. Furthermore, the user can specify the number of sub-divisions required between events thus vary the apparent resolution of the power consumption profile.

35 Claims, 12 Drawing Sheets

Major Events of a Cell Phone Test

Flow Chart for Dynamic Power Analysis using Palladium

U.S. PATENT DOCUMENTS

2004/0019859 A1   1/2004  Ravi et al.
2004/0138845 A1*  7/2004  Park et al. .................... 702/108
2006/0058994 A1*  3/2006  Ravi et al. .................... 703/23
2008/0077380 A1*  3/2008  Tamaki et al. ................ 703/15
2008/0127001 A1*  5/2008  Tamaki et al. ................ 716/2

OTHER PUBLICATIONS

Ludwig R et al: "Power Estimation Based on Transition Activity Analysis With an Architecture Precise Rapid Prototyping System", Rapid System Prototyping, 2002. Proceedings. 13th IEEE International Workshop on Jul. 1-3, 2002, Piscataway, NJ, USA, IEEE, Jul. 1, 2002, pp. 138-143.

Enrico Macii et al: "High-Level power Modeling, Estimation, and Optimization" IEEE Transactions on Computer Aided Design of Integrated Circuits and Systems, IEEE Service Center, Piscataway, NJ, US, vol. 17, No. 11, Nov. 1998, pp. 1061-1079.

International Search Report and Written Opinion; Oct. 17, 2006.

* cited by examiner

Simple Power Consumption Histogram

Flow Chart for Dynamic Power Analysis using Palladium

Identify Key Areas of Interest and Define Granularity

Zoom-in and Refine resolution

Correlate Power Consumption with User Defined Events

Alternative ways to specify Sampling Windows

Specify Sampling Windows
Between two events

Overlapping Sampling Windows

Events, Sampling Windows and Segment Dividers

Power Consumption for Whole Chip and Blocks

SYSTEM AND METHOD FOR ANALYZING POWER CONSUMPTION OF ELECTRONIC DESIGN UNDERGOING EMULATION OR HARDWARE BASED SIMULATION ACCELERATION

CROSS-REFERENCE TO RELATED APPLICATIONS

This application claims priority to U.S. Provisional Application Ser. No. 60/687,021, filed Jun. 3, 2005. Priority to this prior application is expressly claimed, and the disclosure is hereby incorporated by reference in its entirety.

FIELD

The present disclosure relates generally to design verification systems and more particularly, but not exclusively, to the use of hardware-based functional verification system such as hardware logic emulation or simulation acceleration systems for analyzing power consumption when developing logic circuits or systems.

BACKGROUND

Modern integrated circuits (ICs) are usually designed using CMOS technology. Some of the advantages of using CMOS instead of other technologies such as bipolar are smaller circuit geometries and lower power consumption. In the past decades, IC design and fabrication technology has advanced such that millions of transistors can be fabricated on a single integrated circuit. While each transistor may only consume a very small amount of power, that miniscule amount of power consumption becomes quite high in a multi-million transistor IC. In many battery operated applications, such as cellular phones, notebook PCs (Personal Computers), PDAs (Personal Digital Assistants), MP3 players, digital cameras and camcorders, it is highly desirable to reduce power consumption, thereby extending the time such portable electronic device can operate for each recharge. For some other high performance applications, such as microprocessors, it is very important to find a way to reduce the power consumption because the high frequency clock driving those ICs leads to higher power consumption, which requires elaborate and expansive means to dissipate the heat generated. For example, the monthly electricity bill for computer server farm is a significant portion of the operator's expenses.

Power integrity is also important to designers of integrated circuits. Current is supplied to the transistors of an IC through power grids. The local voltage of each transistor may be affected by the voltage drop from the power source according to Ohm's Law (delta V=I*R where delta V is the voltage drop, I is current and R is resistance). If certain portions (sometimes referred to as blocks) of the IC consume too much power at any given instant, the voltage for this block or its neighboring transistors may drop below the threshold voltage for the device to operate reliably. Designers must understand the power grid design and the power consumption profile to ensure that the IC being designed can operate reliably under the intended application environment. Prior art power analysis techniques are either inaccurate, cannot provide enough detail to be useful, or both.

The power consumed by an IC can be divided as either static power consumption or dynamic power consumption. Static power consumption is the power the IC consumes when the IC is powered on but not doing anything (none of the signals are toggling between logic level high ("one") and logic level low ("zero")). Static power consumption is usually caused by leakage current flowing through transistors. In contrast, dynamic power consumption is the power an IC consumes while the circuit is actually operating. Dynamic power consumption is usually caused by transistor switching activity. Each time a logic gate changes state (i.e., from a one to a zero or vice-versa), it has to charge or discharge the associated parasitic capacitance. In addition, there is a small time period during the state transition that both the nFET and pFET are turned on which results an instantaneous feed-thru current. In general, dynamic power consumption is far greater than static power for most CMOS ICs.

In general, dynamic power consumption in a CMOS circuit is proportional to the frequency of state transitions. Most dynamic power analysis is based on the transition activities of the IC being analyzed, often referred to as the design under test ("DUT"). This information is usually obtained by simulating the operation of the DUT stimulated by test vectors or a test bench provided by the designer of the IC. Simulation is performed using tools referred to as simulators (sometimes referred to as software simulators). Simulator is a software program that models behavior of integrated circuit designs in a computer/workstation. In conjunction with the physical design attributes (i.e., layout and routing) of the IC, the dynamic power consumption of an IC can be calculated. Using the simulation tool, the designer can analyze the result and determine if the design has met the power consumption limits required for the IC design.

Because of the extensive computations involved when using prior power estimation tools, many designers choose to perform power consumption analysis using average power consumption. FIG. 1 is a graph showing an example of power consumption over a certain period of time. The X axis of this graph (and the remaining power consumption graphs) shows the duration of time over which functional verification, i.e., emulation or simulation, of a circuit takes place. The Y axis of this power graph (and the remaining power consumption graphs) shows the actual power consumption. As can be seen in FIG. 1, the actual power consumption of a DUT, seen in curve 10, can have multiple peaks that exceed the average power level, which is illustrated by curve 15 (which is a straight line). Because the average power consumption does not reflect the actual power consumption at particular times, many circuit designers take the value for average power consumption and add a safety margin, for example fifty percent, to compensate for the fluctuation in actual power consumption. Such assumptions can be wrong and result in a product that is either too costly due to over design or fail to operate reliably during peak consumption due to IR drop, overheating or other problems. With prior art power estimation methods using simulation, circuit designers usually had no choice but to accept these compromises.

One type of electronic design automation tool is the hardware-based functional verification system, e.g., hardware logic emulation systems and simulation accelerators (for simplicity, both emulation systems and hardware based simulation acceleration systems may be referred as emulation systems in the subsequent discussion). Emulation systems are used to verify the functionalities of electronic circuit designs prior to fabrication as chips or as electronic systems. Typical emulation systems utilize either interconnected programmable logic chips or interconnected processor chips. Examples of hardware logic emulation systems using programmable logic devices can be seen in, for example, U.S. Pat. Nos. 5,109,353, 5,036,473, 5,475,830 and 5,960,191. U.S. Pat. Nos. 5,109,353, 5,036,473, 5,475,830 and 5,960,191 are incorporated herein by reference. Examples of hardware logic emulation systems using processor chips can be seen in, for example, U.S. Pat. Nos. 5,551,013, 6,035,117 and 6,051,030. U.S. Pat. Nos. 5,551,013, 6,035,117 and 6,051,030 are incorporated herein by reference.

The DUT is usually provided in the form of either RTL (Register Transfer Level) description or gate level netlist (or "netlist" as it is referred to by those of ordinary skill in the art). The gate level netlist may have been derived from RTL sources, including from a hardware description language (HDL), such as Verilog or VHDL, using a method called synthesis. Both RTL and gate level netlists are descriptions of the circuit's components and electrical interconnections between the components. The components include all those circuit elements, such as combinatory logic (e.g., gates) and sequential logic (e.g., flip-flops and latches), necessary for implementing a logic circuit.

Until now, hardware-based functional verification systems such as emulation systems and simulation accelerators have been used to perform functional verification of logic designs. These hardware-based functional verification systems have certain advantages over software simulation tools. For example, as discussed, software simulation tools create models of user's design that are simulated in a computer workstation. All of these operations are conducted in a serial fashion with a single or a small number of CPUs. In contrast, hardware-based systems have dedicated hardware that will perform the designed functions in parallel. This massive parallelism enables a hardware-based system to operate at a speed that is orders of magnitude faster than a software simulator. Because emulators can operate so much faster than simulators, they can perform functional verification much faster. For example, an emulator can execute thousands of clock cycles of a DUT in a few milliseconds. Thus, in the same amount of time an emulator executes millions of clock cycles, a software simulator might only have simulated the execution of a few or even just a fraction of a clock cycle. In fact, emulators can operate at speed fast enough to allow the intended application software to run on the prototype system, which is something the software simulator can never accomplish.

Another advantage of hardware-based systems over simulation is their ability to operate "in circuit". Operating "in circuit" refers to an emulator's ability to operate in the actual hardware that the DUT being emulated will eventually be installed into once it has been fabricated. This actual hardware is sometimes referred to as the "target system". For example, the designer of a microprocessor might emulate the microprocessor design. Using a cable connecting the emulator to the motherboard of a personal computer, the emulator can be used in lieu of the actual microprocessor. The ability to operate in circuit provides many advantages. One of them is that the designer can see how their design functions in the actual system in which the DUT will eventually be installed. Another advantage is that in circuit emulation allows software development to take place before the IC chip is fabricated. Thus, the emulator can emulate the IC in the target system while the design team writes firmware and tests other application software.

As discussed, while simulators provide some level of information about the DUT's operation when used during power analysis, ICs being designed today will be operating in more complex environment with more stringent power consumption requirements than ever. Thus, there is a need for more sophisticated power analysis tools and methods that assist design engineers to understand power consumption problems better in order to reach their power consumption design objectives without too much guess work.

One of the major benefits of the present teaching is to enable the user to perform "What If" analysis. In the prior art, plotting a realistic power consumption graph is virtually impossible due to the performance limitations of the simulator. With hardware based verification system, this bottleneck is removed. The user now can try many different implementation options to determine which is best. The present teaching also allows the user to observe the impact of application software to power consumption therefore enable the user to tune the software for power optimization which is not practical with the prior arts.

SUMMARY

The presently described embodiments provide a method for performing dynamic power analysis using hardware logic emulation or simulation acceleration systems. As discussed, prior power analysis techniques used software simulation tools, but do not use emulation systems.

In one embodiment described herein a method for calculating power consumption of a logic design is disclosed that comprise running the logic design in a hardware-based functional verification system, collecting state transition data for each logic gate and register in the logic design for state transitions taking place during a first sample period. The first sample period comprises a first predetermined number of clock cycles. The power consumed by the logic design is calculated using the state transition data collected during said first sample period.

In another embodiment, state transition data for each logic gate and register in the logic design can be collected for state transitions taking place during a second sample period. The second sample period comprises a second predetermined number of clock cycles. The power consumed by the logic design is calculated using the state transition data collected during the second sample period. The power consumption calculated for the first sample period and the second sample period are plotted on a graph, thereby displaying power consumption for the logic design.

In another embodiment, power consumption is calculated by defining a power event, where power event is defined by a triggering condition. The triggering condition comprises predetermined state conditions for specified nodes in the logic design. A sampling window is also defined. The sampling window comprises a plurality of samples, where each of the samples defines how many cycles of a clock driving the logic design for which circuit transition data for each logic gate and register in the logic design will be collected. The logic design is run in a functional verification system and when the power event is trigger, state transition data is collected. The power consumed by the logic design is then calculated using the state transition data collected. The calculated power consumption is then displayed on a power consumption graph.

In another embodiment, the power consumption of a logic design is calculated by running the logic design in a functional verification system. State transition data for each logic gate and register in the design is collected while the logic design is emulated over a power evaluation period. The power evaluation period is divided into a plurality of windows, wherein each of the plurality of windows is defined by a predetermined number of segments. Each of the segments comprises state transition data for a number of clock cycles taking place during a time period while the logic design was run in the functional verification system. The power consumed by the logic design is calculated using the state transition data for each of the segments. The power consumption calculated for each of the segments is then plotted on a graph, thereby displaying power consumption for the logic design.

The above and other preferred features of the invention, including various novel details of implementation and combination of elements will now be more particularly described with reference to the accompanying drawings and pointed out in the claims. It will be understood that the particular methods and circuits embodying the invention are shown by way of illustration only and not as limitations of the invention. As will be understood by those skilled in the art, the principles and features of this invention may be employed in various and numerous embodiments without departing from the scope of the invention.

Figure 1:
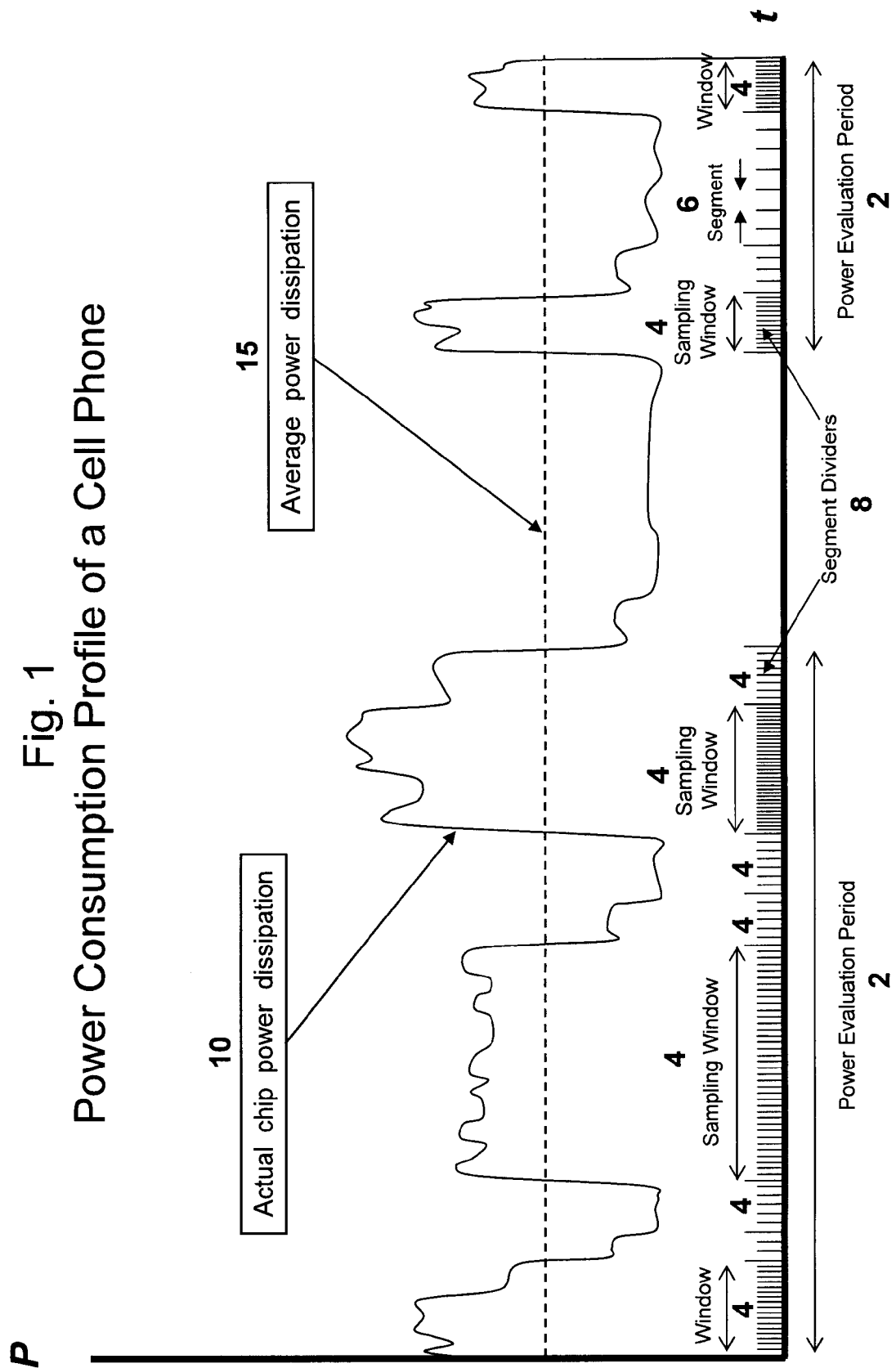
FIG. 1 is a graph showing an exemplary power consumption profile of an IC design.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not describe every aspect of the present invention and do not limit the scope of the invention.

DETAILED DESCRIPTION OF THE DRAWINGS

Each of the additional features and teachings disclosed below may be utilized separately or in conjunction with other features and teachings to provide improved design verification systems and methods for designing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

As discussed, hardware emulators can mimic the operations of a DUT (i.e., the user's design under test) at the rate of hundreds of thousands cycles per second or more, which is typically many orders of magnitude faster than can be achieved using software logic simulation tools. Taking advantage of this superior performance, the various embodiments described herein can collect and process data that are required for accurate power consumption analysis. One piece of key data needed to accurately calculate dynamic power consumption is circuit activity data. Circuit transitions, as well as the duty cycle of those transitions, are collected and stored in what will be referred to herein as a "transition activity log". Because an emulation system can run far more clock cycles in a given amount of time than software simulators, the transition activity log generated by an emulator will have far more data stored therein. Having all this additional data regarding circuit transitions will result in more accurate power consumption calculations. Moreover, because an emulator can be placed in the real application environment by going "in circuit" with the target system, the transition activity log can track transitions that will occur in the actual system in which the fabricated integrated circuit will be installed. The transition activity log recorded with this method can be far more accurate and realistic than the one produced by software simulator under the assumed test vectors created by the designer.

Using a hardware emulator and the present teaching allows the designer to interface the emulated design with intended application environment and run the intended application software to produce a realistic activity log which can be used to calculate the power consumption profile that can be correlated to the actual circuit activity. Using software simulators to generate the activity log with real application is not practical because software simulators operate so much slower than emulation systems and would have to take too long to achieve the same results.

To prepare a logic design for power analysis using an emulator, the user's design, which as discussed is usually in the form of a gate level netlist or RTL (register transfer level), is compiled so that it can be implemented in the emulator. In the case of the Palladium series of emulators sold by Cadence Design Systems, Inc., the compiled user's design that can be run on the emulator is referred to as a "proto" file. Once the compiled user's design is programmed into the emulator, it will behave exactly as the fabricated chip does in the given environment. The designer can boot up its operating system and execute the application software instructions to make the DUT now running in the emulator (i.e., being emulated) exercise all the functions of that DUT in a realistic application environment.

In most CMOS devices, the dynamic power consumption is much higher than the static power consumption. The manner in which dynamic power consumption analysis performed according to an embodiment described herein is as follows. First, the designer will identify certain functions that their integrated circuit design can perform and for which the designer would like an estimate of power consumed for those functions. For example, when designing a chip for a cell phone, a designer might want to know how much power is consumed when a text message is typed on the phone and then transmitted. The designer can key in a short message, enter the menu, select a phone number in the directory and send the text message to another phone, just like a person would do with his cell phone. A hardware logic emulation system with the DUT design compiled and downloaded therein can perform all these functions, and record or derive the transition activities of all the circuit nodes in the design, perform the required data reduction to store the data in an appropriate format (such as TCF, which is an abbreviation for Toggle Count Format) on the hard disk of the computer/workstation connected to the emulator. These files are then fed into other tools that can use the data collected by the emulator to estimate the dynamic power consumption. Examples of preferred tools include RC (RTL Compiler or Register Transfer Level Compiler) and Voltage Storm, available from Cadence Design Systems, Inc., San Jose, Calif. The results are analyzed and organized by power analyzer software.

The various embodiments described herein are directed to using emulator to address the performance shortcoming of the traditional software simulator on obtaining the activity log, thus associated to the dynamic power. However, because that the power estimation was performed by power calculation software tools (two examples of which are the RC or Voltage Storm products from Cadence Design Systems, Inc.), and those power calculation software tools all have the capability to estimate static power as well, the emulation based power analysis described herein can perform the full power analysis, i.e., static power consumption analysis as well as dynamic power consumption analysis.

A few terms to be used in this description are explained here. In FIG. 1, power analysis period 2 is the time duration that the emulator is capturing the DUT internal activities for power evaluation. There could be one or more power evaluation period for each test run. A sampling window 4 is the time window associated with one or more power events defined by the user. Power events will be discussed in more detail below. The collected power consumption data are processed and presented for each sampling window. There are multiple sampling windows 4 in a power analysis period. Sampling windows 4 are sometimes shortened as windows in this document. Each sampling window 4 can be divided into multiple power evaluation segments 6. All of the transitions taking place within a segment are grouped together as one sample and a corresponding TCF is generated for power calculation. The segments 6 in a given event window 4 can be defined by the user in different ways, and do not have to be of the same length. In FIG. 1, the shorter marks on the X-axis denote the segment 6 divider 8 and the longer marks separate the windows 4.

The actual operations conducted by a design under test (DUT) like the cell phone example described above are as follows. First, the DUT performs a power-on-self-test and establish a connection with a local base station of the cell phone network. Then, a short text message or equivalent is typed on a keyboard or equivalent. A telephone number is selected and the short text message is transmitted. After transmission, the system hangs up, thereby terminating the call. While the DUT is idling, the system could receive a short message from the base station. The DUT goes back to idle state afterwards. Finally, the cell phone is turned off. A graph showing the actual and average power consumed performing such a function is presented in FIG. 1. The actual power consumption can be seen with curve 10. The average power consumption for the entire operation can be seen with curve 15.

Figure 2:
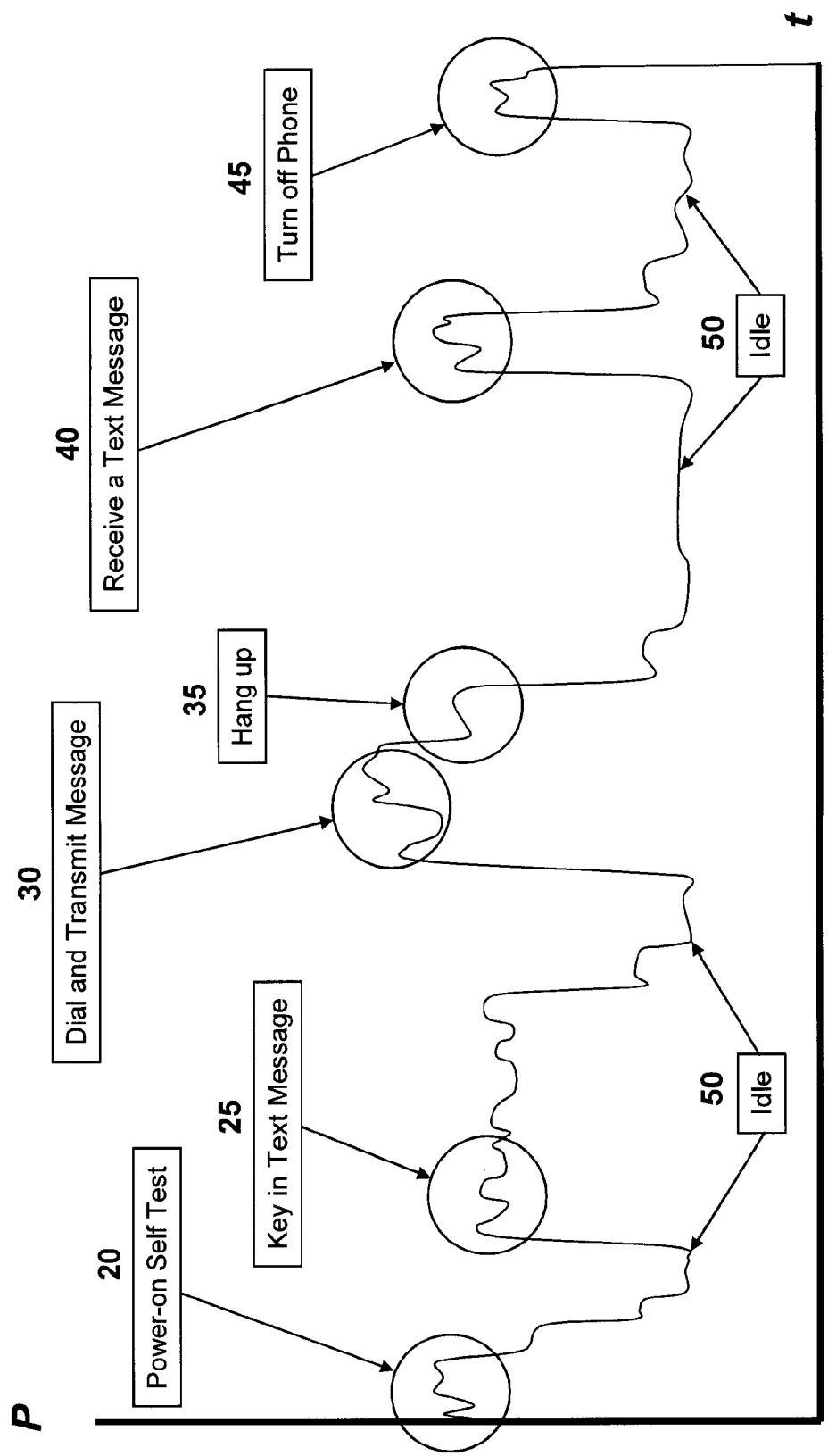
FIG. 2 is a graph showing major events that affect power consumption in the example shown in FIG. 1.

FIG. 2 shows the major events of this exemplary cell phone test. When evaluating the actual power consumption, one can see that the power-on-self-test creates a first power consumption peak 20. Keying in the text message creates a second power consumption peak 25. Initiating the call creates a third power consumption peak 30. Hanging up (i.e., terminating the call), creates a fourth power consumption peak 35 (the phone has to perform a series of operations in order to terminate the call and return to idle). While in idle, it receives a call that creates a fifth power consumption peak 40 (the phone would ring but it was not answered). Finally, the phone is turned off (after a power down sequence) and encounters another power consumption peak 45. Between the major events, the cell phone would be sitting in idle state 50.

Figure 3:
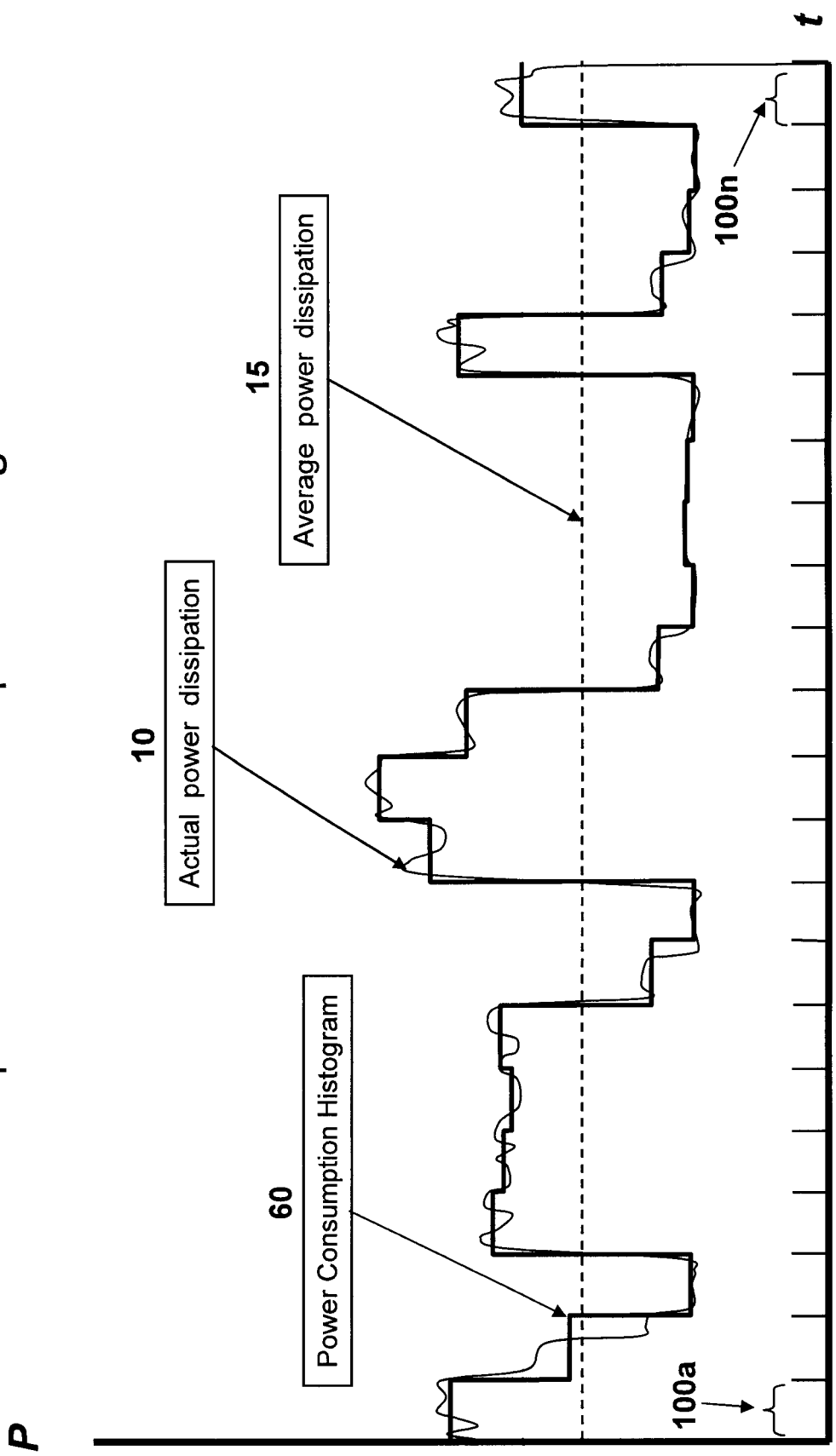
FIG. 3 is a simple power consumption histogram with equally-sized power evaluation samples.

One way to capture power consumption data is to divide the whole power evaluation period into a number of equal power evaluation segments i.e., samples. The power consumption graph that is generated by using such a method can be seen in FIG. 3. Curve 10 shows the actual power consumed by the user's DUT. The average power consumption for each segment, e.g., sample, $100a$, $100b$, . . . $100n$, is plotted as a histogram 60. Each sample $100a$, $100b$, . . . $100n$ represents the transition activity over predetermined number of clock cycles. Thus, for each sample $100a$, $100b$, . . . $100n$, the system will determine how many logic state transitions (both sequential and combinational) take place for the entire design (or a portion thereof, should the user desire) during that sampling segment, as well as the duty cycle. This information is provided to the power calculation software tool (e.g., Cadence's RC, Voltage Storm), which then calculates the power consumed during each segment $100a$, $100b$, . . . $100n$. As can be seen in FIG. 3, dividing the time of interest into a plurality of samples $100a$, $100b$, . . . $100n$ results in a power consumption graph that better resembles the actual power consumption curve.

Many users would prefer an even more detailed power consumption graph. One way to do that would be increase the number of samples. However, increasing the number of samples requires significantly more computation resources and consequently significantly longer processing times for producing a power consumption graph with increased resolution. Never-the-less, this power consumption graph still may not give enough resolution for the critical operational periods such as when the power consumption peaks. Thus, simply increasing the number of samples is not the preferable manner of using the present teachings.

As discussed the circuit transition data collected by the emulator is collected for power consumption calculations. There are two ways to estimate the dynamic power consumption using the circuit transition data collected by the emulator. One is a detailed calculation similar to an analog circuit simulation, like SPICE simulator. SPICE produces very accurate results, but takes a large amount of time because of the detailed and numerous calculations that SPICE has to perform. The second method uses statistical model based on the transition frequency of each circuit over a given period of time. This method does not provide results as accurate as using SPICE in the microscopic view, but does provide a statistical result that is very accurate in the macroscopic view and highly usable, especially when comparing to the prior art methods. Moreover, using this statistical model, the various embodiments described herein can estimate the dynamic power consumption much faster than using SPICE or the prior art methods. Many EDA (Electronic Design Automation) tools are available that can statistically calculate dynamic power accurately. A few examples, mentioned above, are Cadence's RC and Voltage Storm, although other tools can be used as well. Given the targeted semiconductor processing technology and physical design attributes, these power analysis tools can compute the static power consumption as well.

These power calculation tools typically use a file format called TCF, which is an abbreviation for Toggle Count Format. A TCF file includes the toggle frequency and duty cycle of each and every node in the design, for a given period of time. It is a much more compact and efficient data file format for statistical power calculation. The more detailed VCD (Value Change Dump) file format can be used as well but it is not as efficient.

An exemplary TCF is shown in Table 1. The TCF shown in Table 1 shows that signal B toggles 33 thousand times within the capture window, and 75% of time the signal is in logic 1 state. When this activity data for the DUT is fed into power computation tools such as RC or Voltage Storm, both static and dynamic power consumption over the window of interest can be calculated.

TABLE 1

Exemplary TCF

| Signal | Frequency | Duty Cycle |
|---|---|---|
| A | 55K | 50% |
| B | 33K | 75% |
| C | 201K | 66% |
| D | 74K | 50% |

It should be noted that power consumption calculations using a TCF file represent average power consumed during the time segment. When a plurality of these average power consumption segments is assembled together, a power consumption profile can be plotted in the form of a histogram. When performing power analysis, it is highly desirable to know when peak power occurs. Peak power analysis can be important for numerous reasons. For example, a designer needs to know about peak power consumption so that he can foresee whether an integrated circuit can create hazards because of unusually high power consumption. In FIG. 3, the average power consumption over the entire test time is represented as a dotted flat line 15 while the actual power consumed is represented as the solid curved line 10. In the present teachings, power consumption is computed and presented over multiple smaller segments in the histogram 60.

In FIG. 3, the total test time is divided into a number of equal evaluation segments (i.e., samples) 100a-100n. For each user specified evaluation segment 100a-100n, one corresponding set of TCF data is produced by the emulator, recorded on an appropriate storage device (e.g., a hard disk drive) and processed on a workstation. The power consumption graph is shown on a computer display device such as a computer monitor. The user can analyze this histogram to understand how the design consumes power when performing the functions of interest (for example, the phone operations described above). This process can be iterated multiple times to enable the user to explore various design options or alternative test functions until the power consumption requirements of the design are all met, which will be discussed in more detail below. It can be readily seen that the average power consumption curve 15 does not provide any guidance as to when and how high the power consumption is peaking in the actual power consumption curve 10.

For each power evaluation period, there could be hundreds or thousands of TCF files involved. In order to improve the data communication and processing time, two classes of TCF files are created. One master TCF file that contains all commonly used information, such as design hierarchy information. Each segment has one slave TCF file to record all toggle count and duty cycle information for the time segment. In a given analysis period, there is one master TCF file and multiple slave TCF files. Each sample segment has one slave TCF file.

Figure 4:
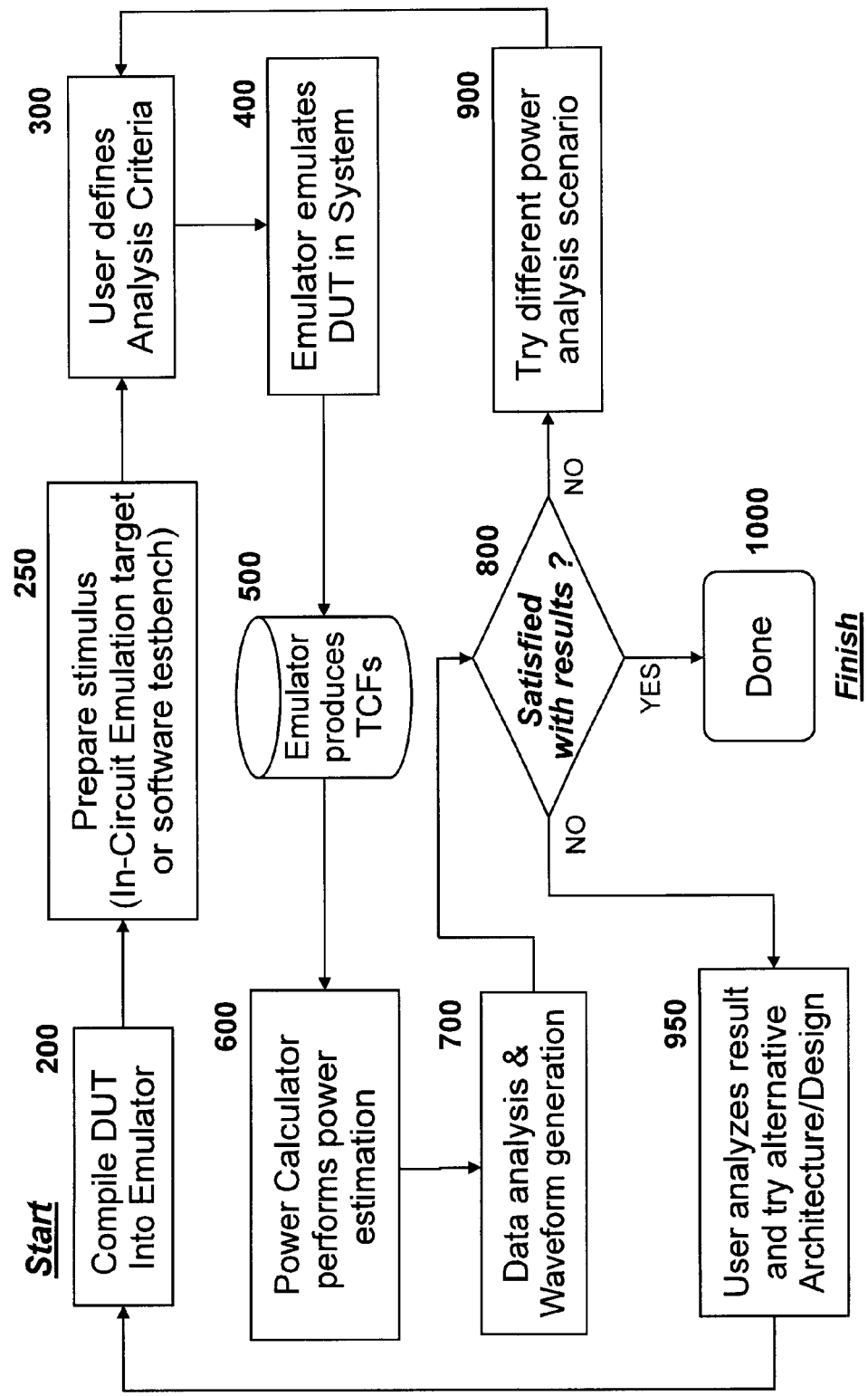
FIG. 4 is a flowchart illustrating a method for performing power analysis using a hardware emulation system according to embodiments described herein.

FIG. 4 is a flowchart illustrating one embodiment using the present teachings to perform power consumption analysis.

In step 200, the user compiles their design into a database that can be downloaded into the emulation system. As discussed, the user design is generally provided as RTL or a gate level netlist. The user will also prepare a test environment, such as the target system for In-Circuit Emulation or software testbench that provide test stimulus (test vectors) as shown in step 250.

At step 300, the user defines meaningful power events in terms of the state of specific internal signals or a combination of internal signals. The user also specifies the duration of power consumption analysis required (i.e., the power evaluation periods 2) and the specification of sampling windows 4 (which include the starting point and ending point or the length of each window, as well as the granularity desired). Typically, designers will want to observe the power consumption of a sampling window with its beginning and ending at an event, or a specified time (in terms of clock cycles) before a power event or after a power event. Alternative, the user can specify the length of a window in lieu of one of the end points. The resolution can be set at a given number of clock cycles per sample, or to divide the length of the window into a given number of equal segments. FIGS. 8a-8b, 9a-9b, 10 and 11 provide a few typical window definitions as examples.

At step 400, the emulation is run, meaning that the user's design is exercised under the user defined condition and environment in the emulator. When performing power consumption analysis, the user will usually run the emulator such that the DUT is driven by application software that will run on the target system. Of course, the user can use other stimulus or testbench to drive the DUT if such target system is not available or not desirable. Once the DUT is emulated for power analysis, the emulator captures or derives circuit transition data for all relevant nodes or registers and builds a transition activity log that covers every relevant nodes and register.

In step 500, the emulator uses an adjustable time scale (i.e., varying the number clock cycles associated with each segment or sample 6) derived from the analysis criteria that the user defined in step 300 to partition and process these data, then package the data into multiple segments, and generate corresponding TCF files for each segment. This will be discussed in further detail below.

At step 600, the plurality of TCF files generated are sent to a power calculation software module such as RC or Voltage Storm to estimate the power consumed by the DUT during each segment of time. The design files of the DUT should have been imported and processed by RC or Voltage Storm beforehand so that they can extract the required characteristics or attributes of the design and its targeted semiconductor processing technology to perform accurate power estimation. This software power calculation module will produce power consumption estimation for each time segment based on the corresponding TCF file.

At step 700, the power analysis system collects all the power consumption estimations for each sample, i.e., time segment, from the power calculation tool, and then analyzes, organizes and presents them in a power graph similar to those shown in FIG. 3.

At step 800, the user can apply pan or zoom to view and study the power consumption waveform of his DUT. Power events can be optionally displayed on the power consumption graph to enable the user to easily identify the power consumption profile with the functions of the DUT. If the result is not full satisfactory and further study is required, the user has two alternatives:

If the user wants to examine the power consumption profile differently, the analysis criteria (such as the definition of power events and sampling windows) can be changed at step 900. For instance, the user may want to focus on a new window (by defining a new event or sampling window) and to observe the power consumption with finer resolution while relax the granularity requirements on other time windows that may no longer be of interest. This process can be iterated arbitrary number of times until the user is completely satisfied. At which point, the power analysis process is finished as in step 1000.

Note that when a user only wants to change how the power consumption graph is drawn, he can simply change the definitions of power events and/or sampling windows (step 300) and resume the process. It is not necessary to start reiteration from the compilation process (step 200). In fact, sometimes the changes are relative minor and can be accommodated by post processing, meaning that the actual emulation (step 400) may not need to be re-run.

On the other hand, the user might want to change the design to achieve a more desirable power consumption performance or make changes to explore "what-if" alternatives (i.e., testing to see what impact a design change might have). Thus, the user, at step 950, can change the design of the DUT to optimize power consumption performance. Likewise, also at step 950, the user might determine that changes to application software will provide such power consumption optimization. After any changes were done with DUT or test environment (including application software), the process illustrated in FIG. 4 can be re-iterated until the designer is satisfied with the power consumption characteristics of their design. The user has complete freedom to choose between the left hand flow (change the design of DUT or test environment) and the right hand flow (change the analysis criteria) anytime during the iterative process. Once all the power consumption requirements are met and verified, the user can end the power consumption analysis (step 1000).

While the discussion so far assumed that the DUT is fully represented by RTL or netlist. That is not a requirement for systems and methods using the present teachings. If the DUT has one or more blocks of circuits that are represented in behavioral constructs, which are not synthesizable and therefore can not be emulated in hardware based verification systems, these behavioral blocks can be simulated with a software simulator, while the synthesizable portions of the DUT are running in the hardware based verification system. This mode of operation is commonly referred as simulation acceleration. The user can develop a corresponding power consumption model that can estimate the power consumption of said block based on the condition of the signals it has to interface with the hardware based verification system. The TCF files generated by the present teaching will not include the activities of those not emulated, therefore won't be counted in the power estimation. The present teachings can combine the power consumption estimated through the TCF files collected using the various teachings described herein in combination with those estimated by the user's power model. Thus, the present teachings can still provide the total power consumption estimation. This is particularly useful when a designer desires to perform architecture trade-off studies in the early phase of the design project when the design is not yet completely mature.

Figure 6:
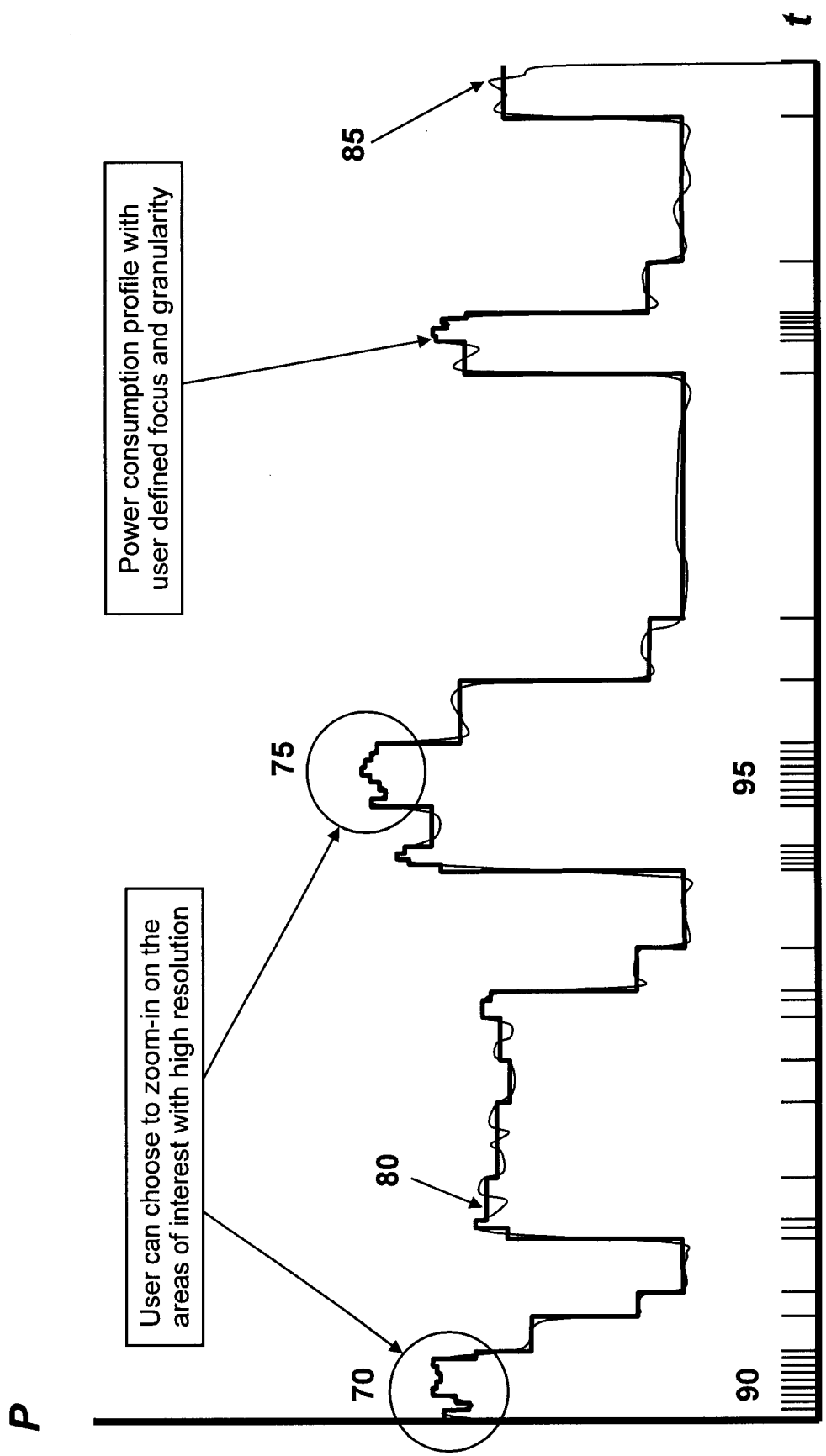
FIG. 6 is a graph showing how varying the size of power evaluation samples can improve the resolution of the power consumption histogram during the windows of interest.

The present teachings allow the user to focus on the power consumed during the time periods that are more relevant without wasting computational resources by generating TCF data for sampling windows that do not require extensive power consumption analysis. FIG. 6 shows a power consumption graph where these improvements are illustrated. Actual power consumption is illustrated by curve 85. The power consumption graph that can be created using the present teachings is illustrated by curve 80. Using the present teachings, instead of simply dividing the time of interest into several segments comprised of the same number of clock cycles, the user defines smaller time segments, i.e., samples comprised of fewer clock cycles, to focus on for power consumption peak investigation. For example, in the example seen in FIG. 6, two peaks 70 and 75 are shown. To obtain better resolution during time windows where the peaks are taking place, sampling window 90 and sampling window 95 are defined with fine granularities. In other words, for sampling windows where power consumption is spiking, the number of samples is increased by reducing the number of clock cycles associated with each sample.

Increasing the number of samples for a given power time window increases power consumption graph resolution. As discussed, each sample 6 is comprised of the toggle and duty cycle data for a predetermined number of clock cycles. This data is supplied to a power calculation software tool, which calculates the power consumed for that sampling segment. Because transition data is collected for fewer clock cycles, the power consumption calculated for those fewer clock cycles is only calculated for that shorter period of time. Thus, as can be seen in FIG. 6, the resolution of the power consumption graph increases, and more closely represents the actual power consumed.

In addition, using an adjustable time scale (i.e., varying the number of clock cycles per sample) allows designers to use computation intensive resources only in the areas of interest (e.g., during operations that are likely to have higher power consumption) and not waste processing bandwidth for analyzing operations that are not likely to create power consumption problems. Thus, the present teachings allow circuit designers to efficiently use computation and emulation resources. In contrast, when analyzing a complex IC with millions of transistors, software simulators can only produce a small number of simulated cycles of activities in a given time. This limits how many cycles of transition activity record it can produce realistically. The short run may not be representative enough for the actual operation of the IC in its intended application.

Figure 5:
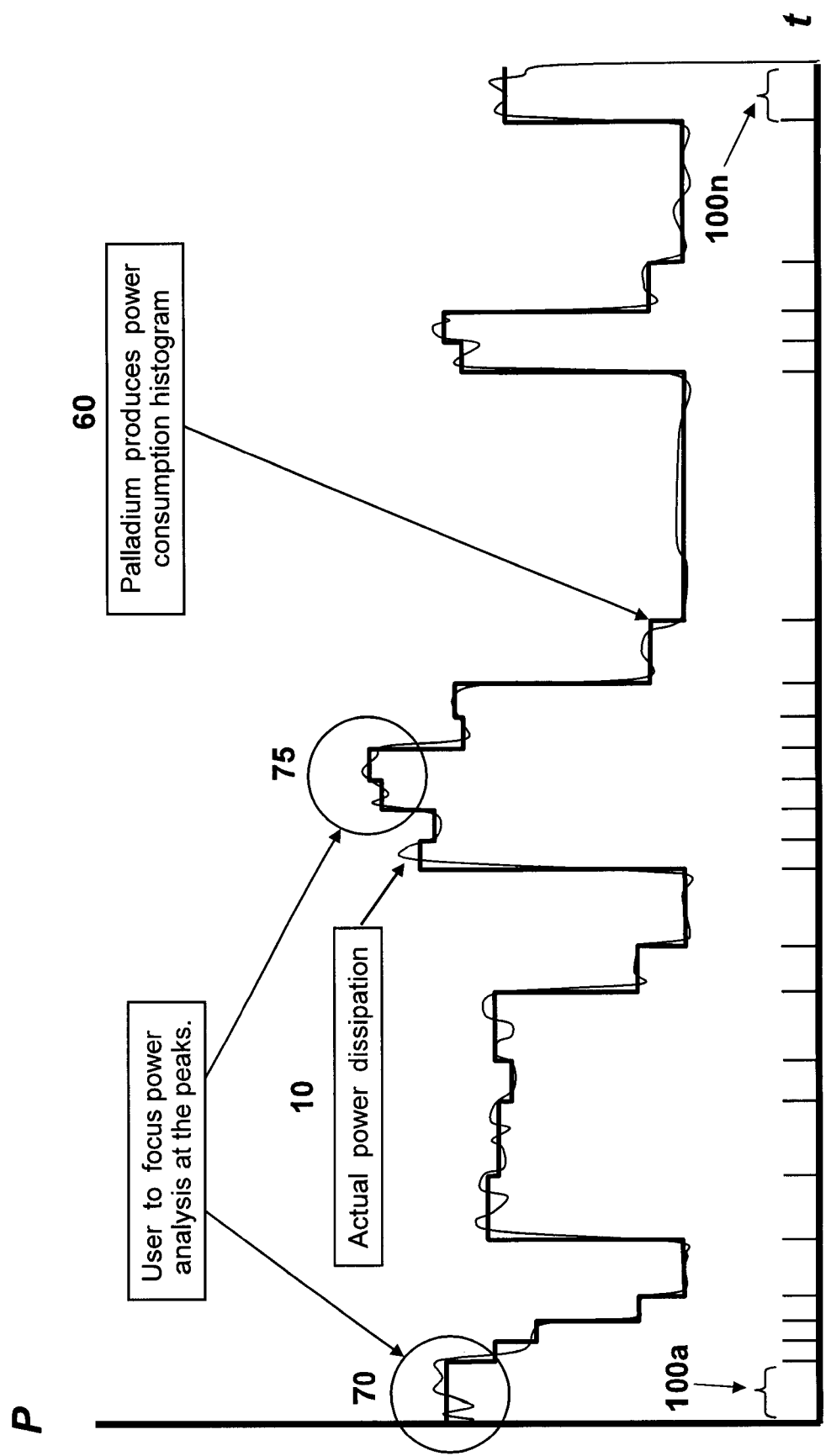
FIG. 5 shows a power consumption histogram where power evaluation samples with adjustable sizing are utilized for different sample windows.

The initial power consumption histogram 60 like that seen in FIG. 3 provides some insight to the user as to where the peak power consumption will occur under the given test condition if the DUT is fabricated as an IC. The designer can then identify the key areas of interest as sampling windows 4 and adjust the granularity of samples 100*a*-100*n*, as seen in FIG. 5. For the areas near the peak power consumption, the designer can sample data with even finer resolution whereas during an idle period, the data sampling frequency can be reduced or even skipped, which will reduce or eliminate the computational time needed for the power consumption calculation. This is done by increasing the number of samples 100a-100n during critical periods while decreasing the number of samples during idle periods as shown in FIG. 5. FIG. 6 illustrates further progression of improving desirable resolution at critical areas while reducing the resolution at non-critical areas to conserve the computational bandwidth.

In the present teachings, an adjustable resolution is used to provide more fine-grained power graph at the critical areas. This concept can be understood by referring to FIG. 5 and FIG. 6. FIG. 5 shows power consumed over a period of time when some of the captured windows are divided into smaller partitions. For example, sample 100a is further divided into a collection of even shorter samples 90. Another sample was further subdivided into sample collection 95. The average power consumption is then computed over each sample. FIG. 6 shows how partitioning the time period of interest into even smaller sampling segments results in a power graph that more closely resembles the actual power consumption curve. In particular, the detailed peak power spikes that were not visible in the power consumption graph seen in FIG. 5 can readily been seen in FIG. 6, where the time segment for each sample has decreased, thus, increasing resolution.

Figure 7:
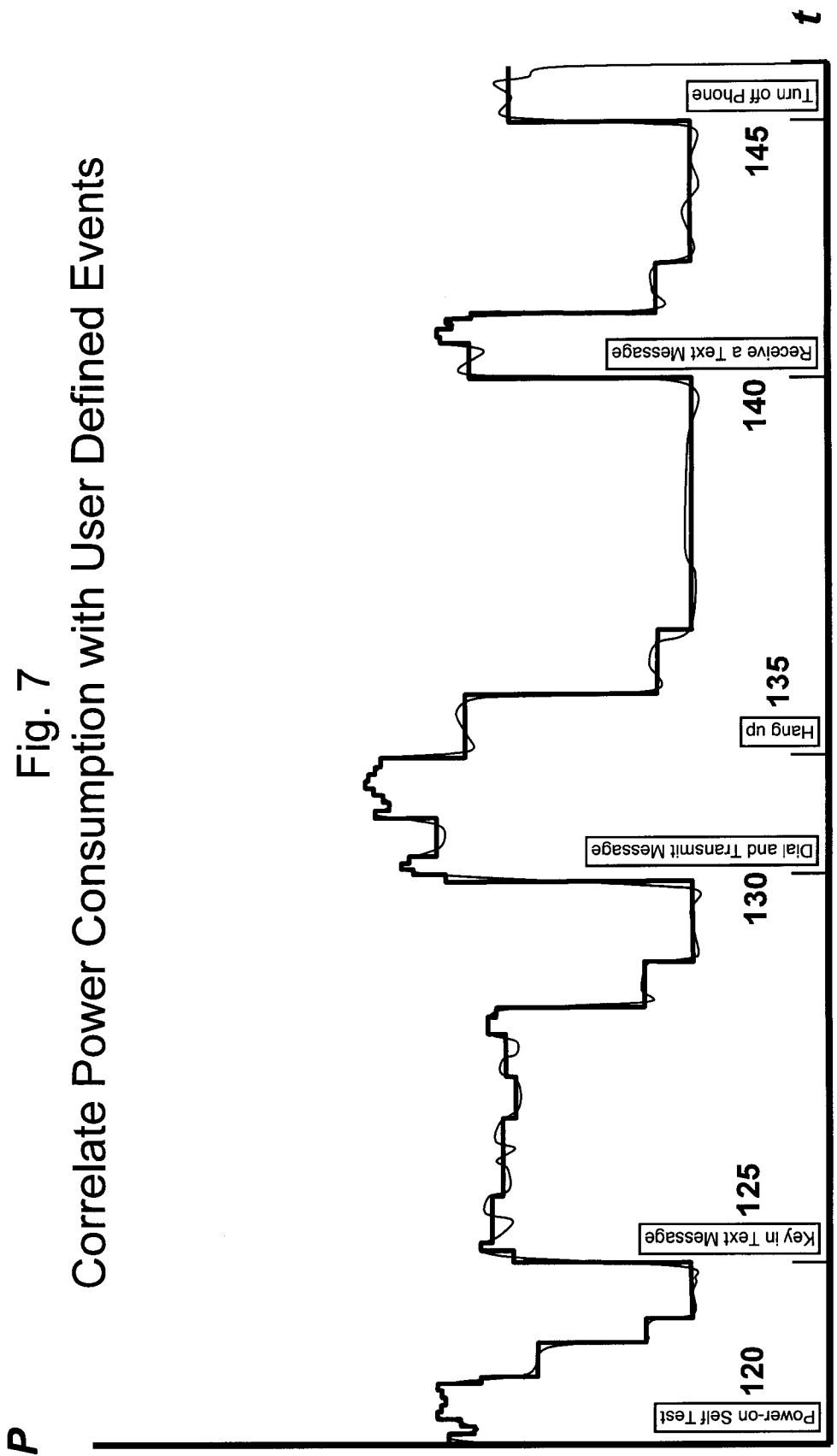
FIG. 7 illustrates how power consumption can be correlated with power events.

Note that the transition activities of a DUT can be recorded in a transition activity log for a long period of time while the circuit is in operation. Because of this, it can be very difficult for the user to keep track of what is happening to the circuit when each power consumption peak occurs. This is particularly true when the user has many different test suites to deal with, which are often re-run after each design change (of which there are usually many). Therefore, it is usually desirable to identify each specific condition (or 'power event') and assign it a unique event name (such as "Event Y" or "Keypad Depression"). The user can then correlate them with the power consumption profile of the DUT, and study and communicate the situation much more easily and precisely. For example, when analyzing the power consumption of a cell phone, the circuit designer would want to know how much power is consumed when the phone is dialed or when the phone user starts talking. With these event names marked on the power profile, it is very easy to identify and understand the power consumption during these events. This concept is illustrated in FIG. 7. Thus, when the user defines power events, they can associate a name or label for that power event. When the histogram is displayed on the screen, a system using the present teachings can also display the name of the power event on the monitor when the event took place.

A system implementing the present teachings allows for significant flexibility on how to specify a sampling window in the present teaching. The user can specify how many samples to take in each window, how long each sample should be (in terms of a user selected clock signal within the DUT), and how is the window aligned with event or sequence of events. A window can also be opened by an event and closed by another. Extra delay or advance time can be added at will.

Figure 8:
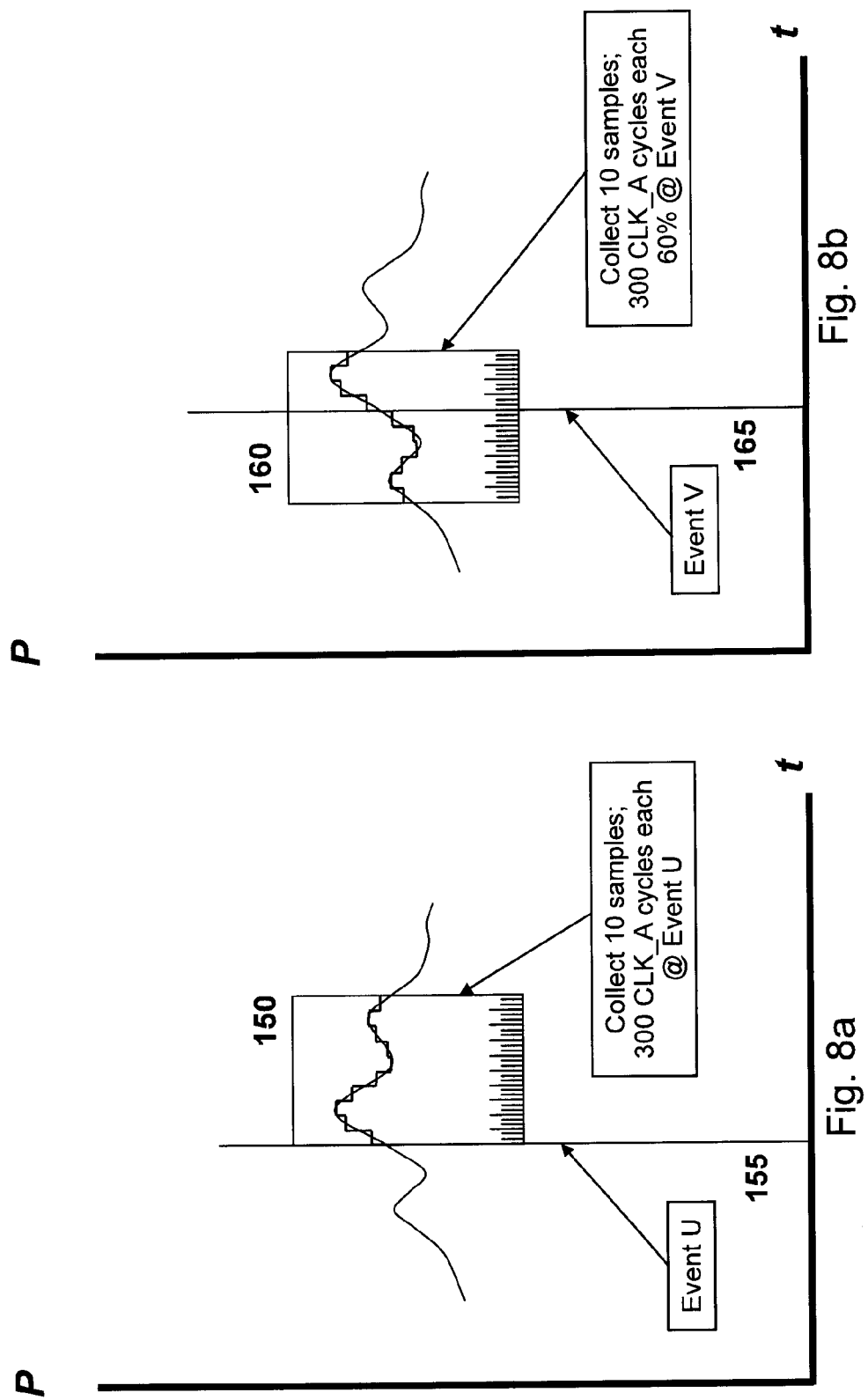
FIGS. 8a-8b illustrate how sampling windows are specified in reference to power events.

Two examples are given in FIG. 8a-8b to illustrate the concept of sampling windows relative to power events. Each short division mark on the bottom of the sampling window represents 100 CLK_A cycles. The long division marks separate evaluation segments. "CLK_A" is defined to be a primary clock signal used throughout the DUT. For example, a user may want to see a window of ten samples with 300 CLK_A cycles for each sample. FIG. 8a shows that the sampling window will start as soon as Event U happens. As seen in FIG. 8b, the user can also specify that the 60% point of the event window is to align with the Event V. So the system will assemble six 300 CLK_A cycles samples prior to event V, and then take four more samples of 300 CLK_A cycles each after Event V. This allows designers to analyze power consumption for the time window before or after a particular power event(s).

Figure 9:
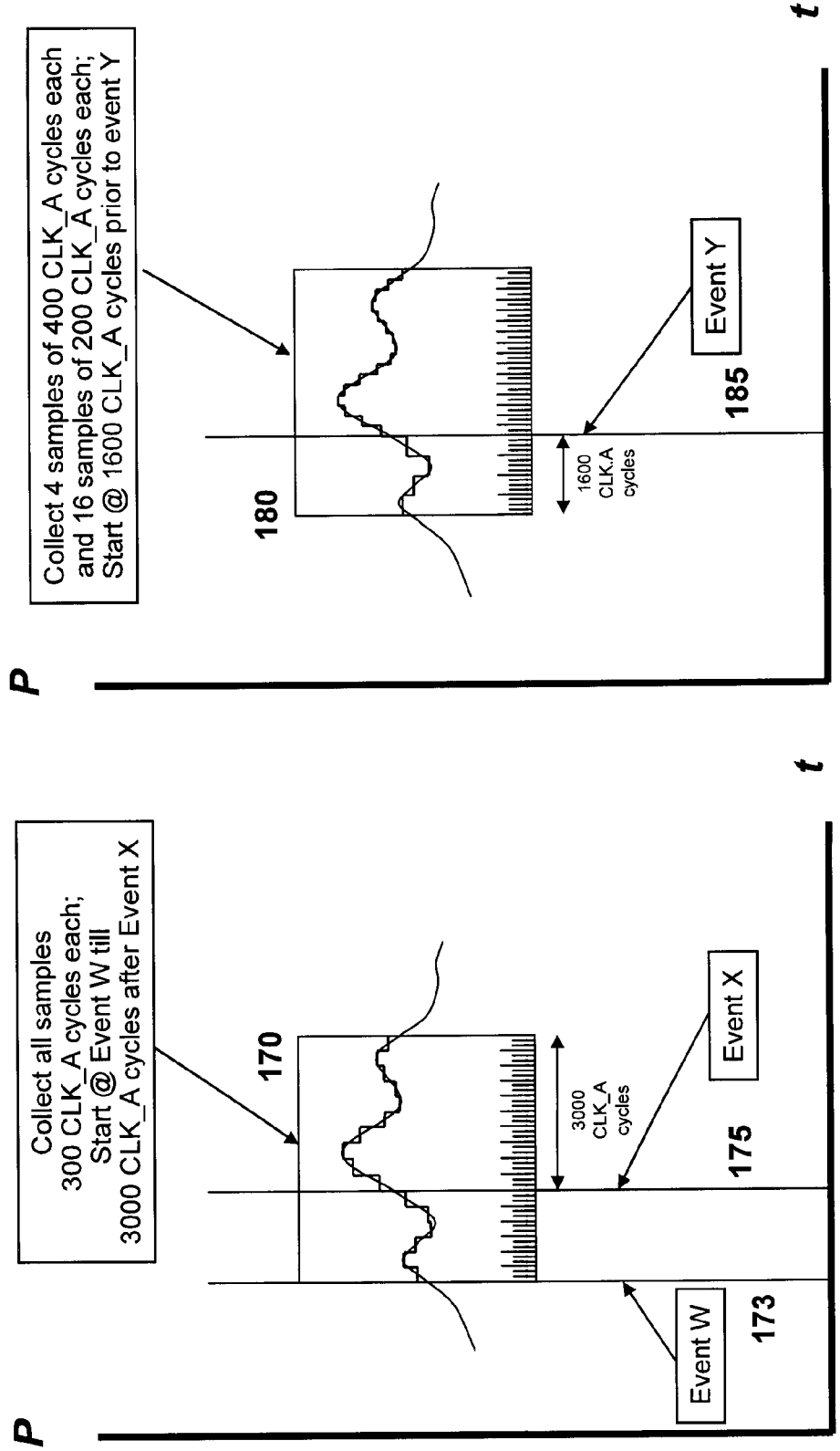
FIGS. 9a-9b illustrate alternative methods of specifying sampling windows.

An alternative manner in which to specify sampling windows can be seen in FIGS. 9a-9b. In FIG. 9a, the user specified that each sample consists of 300 CLK_A cycles. The system will start sampling as soon as Event W occurs, and will continue to sample until 3000 CLK_A cycles after Event X. Note that there are not a definitive number of samples specified here. The system will assemble samples indefinitely until stopped by an ending condition (for example, an ending condition comprising the running of 3000 CLK_A cycles after Event X).

Another way of specifying the sampling windows can be seen in FIG. 9b. FIG. 9b shows that the user can specify different sampling rates within a given sampling window. The exemplary sampling window in FIG. 9b instructs the system to take four samples of 400 CLK_A cycles first, followed by sixteen samples of 200 CLK_A cycles each. The sampling will start at 1600 CLK_A cycles prior to the Event Y. Note that there might be more than one way to specify analysis criteria for a given sampling window. In this particular example, it can also be defined as "Collect 4 samples of 400 CLK_A cycles each with the window ended @ Event Y" and "Collect 16 samples of 200 CLK_A cycles each; start @ Event Y". The two sub-windows will produce the same result as one larger window.

Figure 10:
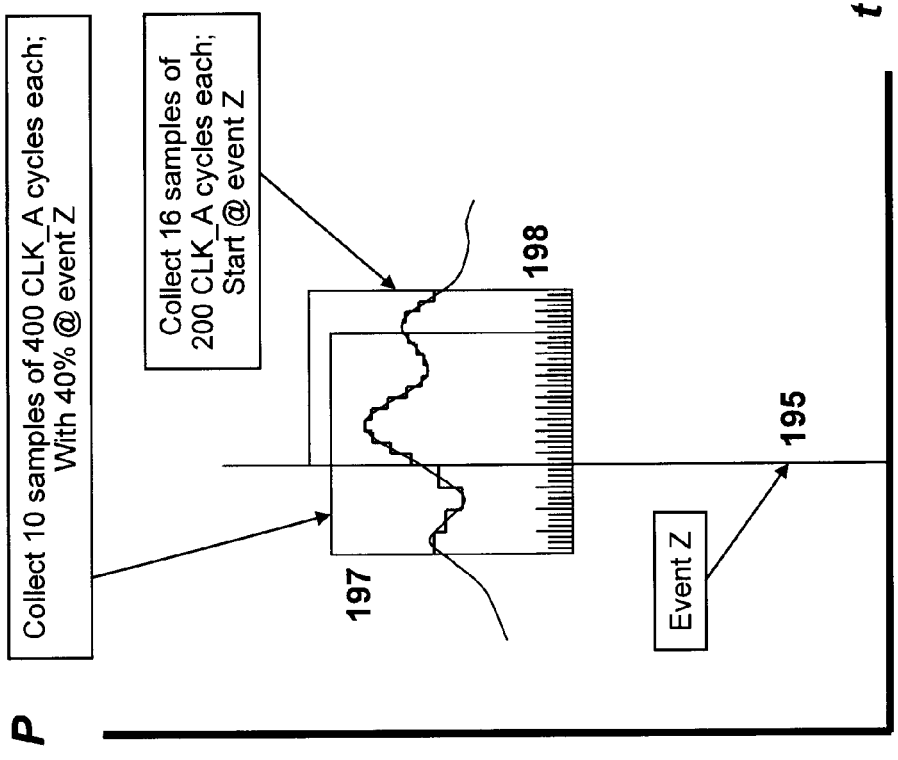
FIG. 10 illustrates that a sampling window can be defined between two events.

Yet another example is to divide the sampling window between two events into n equal number of time segments as shown in FIG. 10. The system is instructed to "Collect 4 samples begin @ 3000 CLK_A cycles after Event U and ended by 1800 CLK_A cycles prior to Event V". If the length of sampling window is not evenly divisible by the number specified, it will be rounded to the nearest number of time units.

Multiple sampling windows can be specified referencing to a plurality of power events. Note that if several sampling windows with different resolution definitions overlap for a given time, in a preferred embodiment, the highest resolution sampling window will prevail and be used for the histogram. If two sampling windows were defined as "Collect 10 samples of 400 CLK_A cycles each; with 40% of window @ Event Z" (window 197) and "Collect 16 samples of 200 CLK_A cycles each; @ Event Z" (window 198), the six samples taken after Event Z in the first window will be overlapping with the first twelve samples defined by the second sampling window. Since the second window has higher resolution (200 CLK_A cycles each), system implementing the present teachings will preferably use the finer granularity defined by the second window instead of 400 CLK_A cycles as defined by the first window. The resultant merged window definition will be the same as window 180 shown in FIG. 9b if the event Z mark is replaced as event Y.

The ability to use adjustable time scales in the present teaching enables the user to adjust the resolution of the power consumption profile to provide more detailed power consumption waveforms for the areas of interest yet allows lower resolution for windows having less or no interest. This reduces the computational load on the computer/workstation, which improves processing time. This feature is not limited to power analysis and can be applied to many other timing waveform displays. This adjustable time scale which is used to partition the collected transition activity log into many smaller segments is based on the user defined analysis criteria.

Because of the flexibility they provide for power analysis, power events and adjustable time scale are very useful concepts. Power events enable the designer to define the activities and duration of interest using a representation that has a look and feel similar to that of other design verification tasks such as functional verification. Defining adjustable time scale allows designers to specify the exact granularity of transition data, and hence power consumption data, to be analyzed and presented. Moreover, the disclosed teachings create links between the power events and power optimization tools, and therefore enable designers to generate more precise power graphs, thereby resulting in more user friendly power analysis without compromise on turn-around time.

Power events will typically be defined by the state of a user's design at some point in time during the emulation. Power events can also be defined by a combination of multiple signals in the design. The power analysis system of the various embodiments described herein will detect each power event after the transition activity log is recorded. The power analysis system will then partition the data into multiple TCF files according to the analysis criteria defined by the user. The TCF file representing a high resolution time step will cover a small segment of time. The TCF files for low resolution steps will each represent a relative longer segment of time.

A method for partitioning the stored transition data (i.e., transition activity log) into multiple segments is as follows. First, the power events are defined by determining which signals in the DUT are required to formulate the events. If needed, "virtual logic" is constructed that can flag the occurrence of each power event.

Next, a tree structure is constructed that links the user defined sampling windows to the corresponding power events so that a sampling window can be opened (meaning available to process data) or closed when an power event takes place. A sampling window can be closed explicitly by an event. Sampling windows can also be closed by an implicit specification such as how many samples after the opening event.

For each sampling window, the user defines how many clock cycles will be associated with each sample, which as discussed, is the manner in which power graph resolution is selected. This could be given by the user explicitly (i.e., by the user defining the clock cycles for each sample) or implicitly (i.e., by the user defining how many samples between the opening and closing of a window).

The transition data, i.e., the transition activity log is then scanned (i.e., the states of the registers and nodes in the DUT are scanned) for power events. When an event is detected, the tree structure is traced to open or close a corresponding window. Note that an event defined by the user could happen multiple times during a power evaluation period, meaning a similar window could also be opened and closed multiple times during the power analysis period.

For each window that was opened and then closed, time stamps (use clock cycle count number) are set up. One set of segment dividers is associated with each sampling window.

Figure 11:
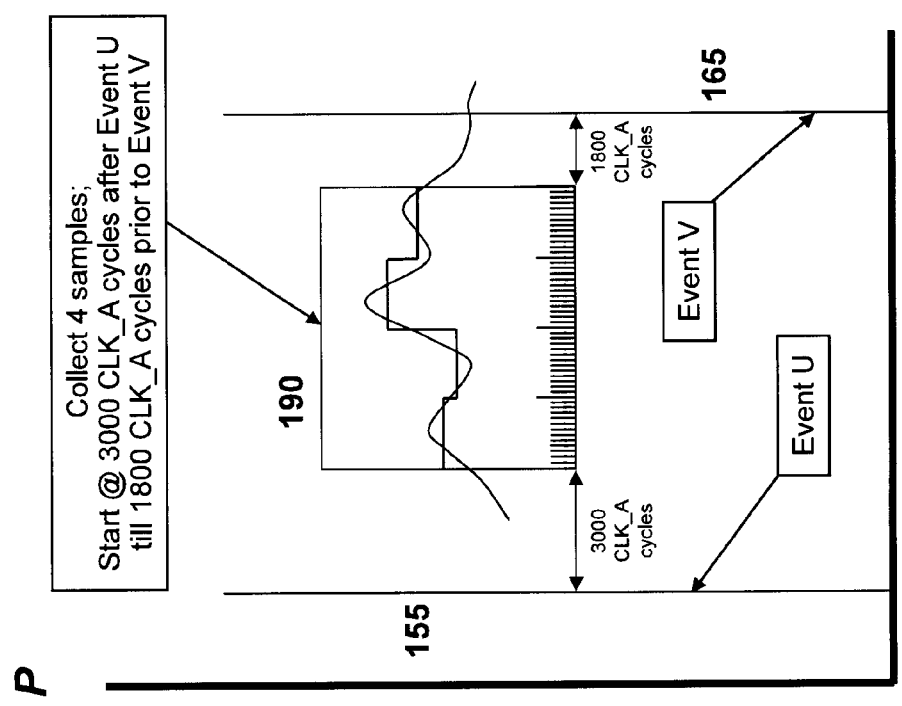
FIG. 11 illustrates how the power graph resolution is determined when two sampling windows overlap with each other.

Once the scan for a power event is complete, the segment dividers are merged. The result is a set of unified segment dividers that provide a series of evaluation segments of various lengths. If there are multiple windows overlapping with each other, such as seen in FIG. 11, the conflict will be resolved in the merge process. In a preferred embodiment, the finer resolution definition has priority and will override the coarse resolution. The lower resolution time stamps in the overlapped areas will be erased.

The unified segment dividers based on merge of all sampling window's segment dividers become the roadmap to partition the stored transition activity log into multiple segments. All the state transitions happened within said segment are analyzed to produce the toggle count and duty cycle for its TCF file.

Figure 12:
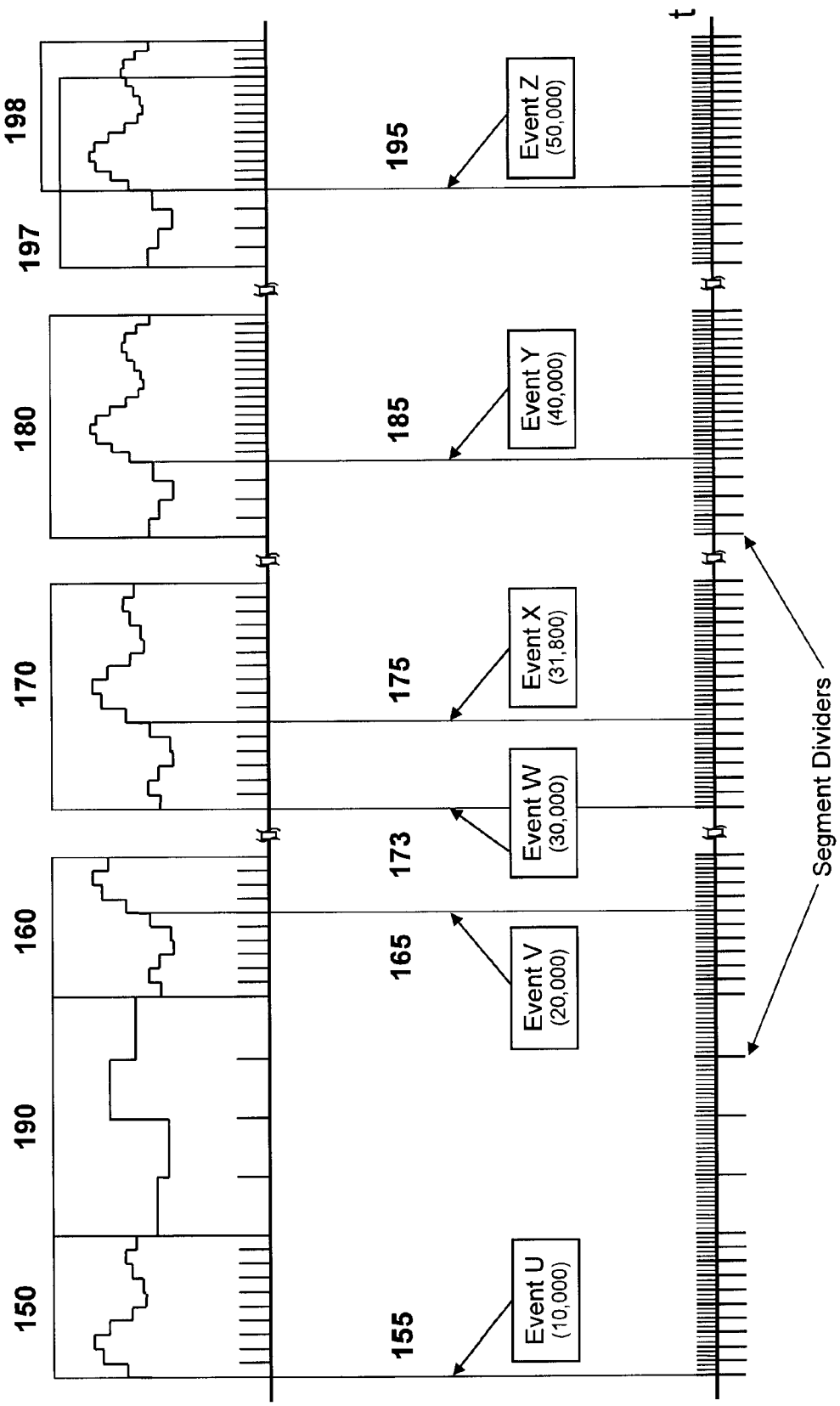
FIG. 12 illustrates the relationship between events, sampling windows and segment dividers.

FIG. 12 is an example illustrating the method to partition the stored transition data (i.e., transition activity log) into multiple segments in order to produce multiple TCF files for power calculation. Sampling windows described with respect to FIGS. 8a-b, 9a-b, 10, 11 and 12 are used here to illustrate the concept. The CLK_A cycle count is used as time reference for time stamp. In this example, it is assumed that the events happen at the following times: Event U @ 10,000; Event V @ 20,000; Event W @ 30,000; Event X @ 31,800; Event Y @ 40,000; Event Z @ 50,000.

A tree structure for searching is built as follows. From the sampling window definitions, it can be determined that event U leads to the opening of sampling windows 150 and 190, and the closing of window 150. Event V leads to the opening of sampling window 160 and the closing of sampling window 160 and 190. Event W leads to the opening of sampling window 170. Event X leads to the closing of sampling window 170. Event Y leads to the opening and closing of sampling window 180. Event Z leads to the opening and closing of sampling windows 197 and 198.

Next, the sample size of each window is established. The samples in sampling windows 150, 160 and 170 will have 300 CLK_A cycles each. Sampling window 180 has four samples of 400 CLK_A cycles each followed by sixteen samples of 200 CLK_A cycles each. Sampling windows 197 and 198 have 400 and 200 CLK_A cycles each respectively. The length of sampling window 190 can be determined to be implicitly 5200 CLK_A cycles from the time difference between event U and event V based on the transition activity log after an emulation run. Each of the four samples should have 1300 CLK_A cycles (5200/4=1300).

After scanning the transition activity log to search for the power events, the time stamps for each window are created. At time=10,000, event U occurs, which leads to the opening of sampling windows 150 and 190. The time stamps produced for sampling window 150 are 10,000; 10,300; 10,600; . . . 13,000. The time stamps produced for sampling window 190 are 13,000; 14,300; 15,600; 16,900; 18,200. At time=20,000 event V occurs which leads to the opening of sampling window 160. The time stamps produced are 18,200; 18,500; 18,800; . . . 21,200. Event W occurs at time=30,000 and leads to the opening of sampling window 170. The time stamps produced are 30,000; 30,300; 30,600; . . . 34,800. Event X at time=31,800 leads to the closing of sampling window 170. At time=40,000 event Y occurs and leads to the opening of sampling window 180. The time stamps produced are 38,400; 38,800; 39,200; 39,600; 40,000; 40,200; 40,400; . . . 43,200. At time=50,000 event Z leads to the opening of windows 197 and 198. Sampling window 197 produces time stamps 48,400; 48,800; 49,200; . . . 52,400. Sampling window 198 produces time stamp 50,000; 50,200; 50,400; . . . 53,200.

From the sorted time stamps, it can be seen that sampling windows 197 and 198 have an overlap. Because sampling window 198 has higher resolution, it overrides the time stamps of sampling window 197 during the period of overlapping. The time stamps from sampling window 197 are revised to 48,400; 48,800; . . . 50,000.

The combined set of time stamps are 10,000; 10,300; . . . 21,200; 30,000; 30,300; . . . 34,800; 38,400; 38,800; . . . 43,200; 48,800; 49,200; 49,600; 50,000; 50,200; . . . 53,200. They now become a set of unified segment dividers that enable the software to partition the transition data (i.e., the activity log) into multiple samples and generate corresponding TCF files accordingly.

In FIG. 12, windows 150, 190, 160, 170, 189, 197 and 198 are shown on the top portion of the histogram. Event U (155), event V (165), event W (173), event X (175), event Y (185) and event Z (195) are shown in the middle. The tick marks on top of the time axis are clock cycle counts, each representing one hundred clock cycles. The longer marks underneath are the resultant segment dividers, which are also shown on the bottom of each window.

In typical logic designs, a 'gated clock' is used to control clock signals and therefore, activity of a circuit. When using gated clocks, a clock that drives the user's design is gated with an enable signal. Usually, this gate is an AND function, meaning that the clock enable signal must be high (logic level 1) for the clock signal to be enabled. When the clock enable signal is low (logic level 0), the clock driving the user's design will be disabled, thus prevent the corresponding portion of user's design logic to change state. With the clock enable signal turned off, the disabled logic will consume very little power. Likewise, when the enable signal is logic level 1, design clock is enabled, design logic become active and consumes more power. Note that there may be multiple gated clock enabling signals in a design. These clock enable signals can be used to define events and sampling conditions in the analysis criteria.

For instance, the system can be instructed to take samples with 500 CLK_B cycles per sample as long as CNTRL_A is "0" and Gate_C is "1". This specification can be overridden if it overlaps with another window with a finer resolution defined.

Figure 13:
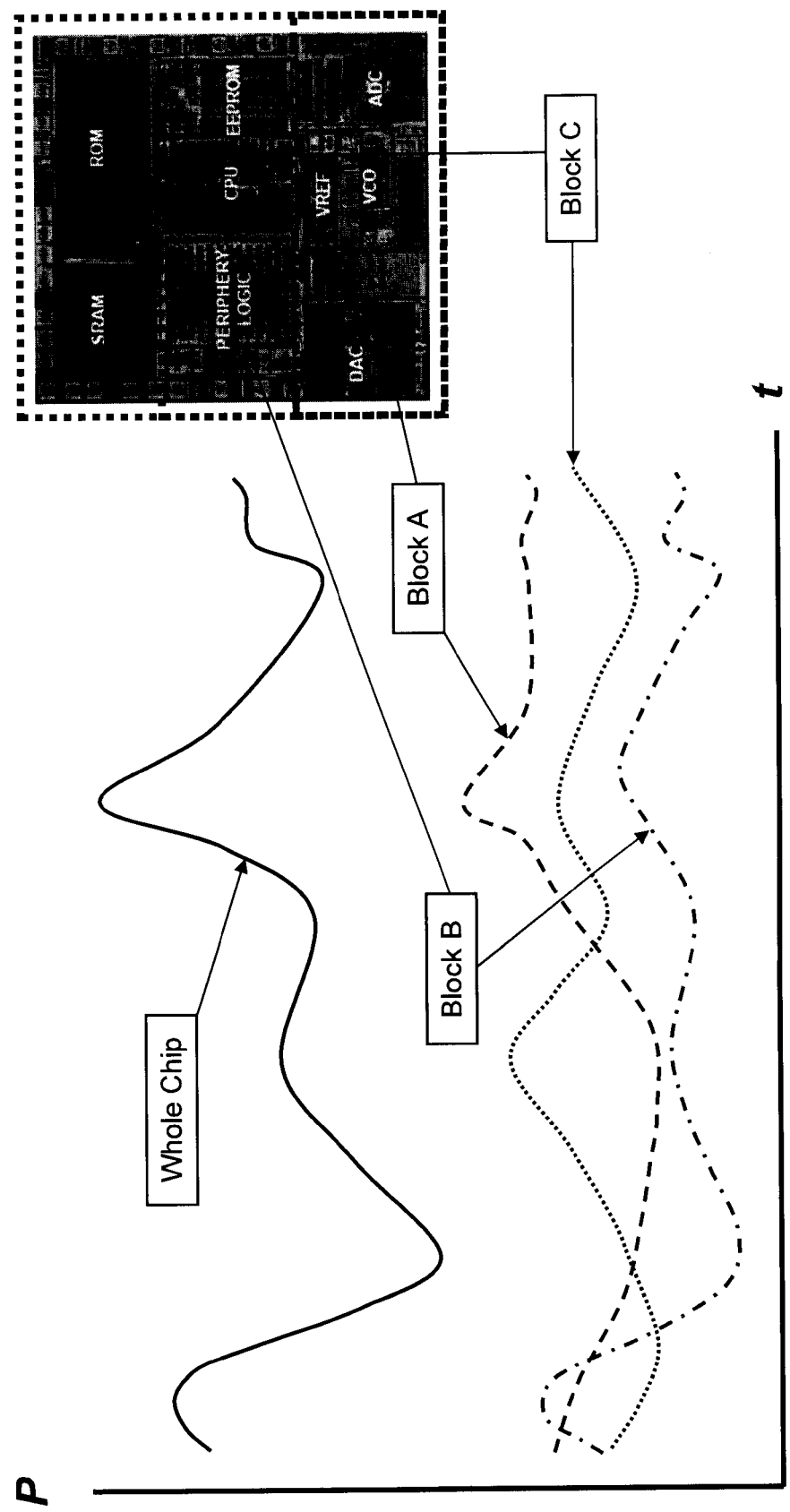
FIG. 13 illustrates an exemplary block level power consumption chart.

The present teaching allows the designer to divide the chip into multiple block/regions and apply power consumption analysis to each specific hierarchical or functional block on the design that requiring investigation. It can be particularly useful to check the IR drop over the power grid for the design, thus ensure the power integrity. This block level power analysis can also be helpful for the user to tune application software that will run on the DUT by correlating the power consumption with the function that the DUT is performing. If the DUT exhibit power consumption spikes, it is possible that the application software can be rewritten to reduce or eliminate the spikes. In FIG. 13, a DUT with three major blocks is shown. The power consumption profile displays both the power consumption curve for the whole chip as well as the three blocks.

In order to use the computational and emulation resources more efficiently, a system using the present teachings allows the capturing of transition activity to be stopped or restarted according to the condition based on the power events. Such a system allow users to define capturing conditions based on a single power event, or in more complex form, based on a sequence of power events. When a capturing condition is met, the emulator captures (or determines) all internal transition activities for power analysis. If there is a long duration that a user does not require power consumption analysis, the data capture function can be turned off to save the storage space and processing time. The present teachings allow the user to turn the capture function on or off for multiple times.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present teachings. The figures do not describe every aspect of the present teachings and do not limit the scope of the claims.

The present teachings are susceptible to various modifications and alternative forms, and specific examples thereof have been shown by way of example in the drawings and are herein described in detail. It should be understood, however, that the claims is not to be limited to the particular forms or methods disclosed.

We claim:

1. A method for calculating power consumption of a logic design by using a computer or a processor, the method comprising:
   programming the logic design into a hardware logic emulation system comprised of a plurality of interconnected programmable integrated circuits;
   emulating the logic design in the hardware logic emulation system;
   running application software on the logic design being emulated in the hardware logic emulation system during a first sample period, wherein the first sample period comprises a first predetermined number of clock cycles;
   collecting a number of state transitions between logic level high and logic level low and duty cycle for each logic gate and register in the logic design for state transitions taking place during the first sample period;
   producing transition activity data using the collected number of state transitions and the duty cycle;
   feeding design hierarchy information of the logic design to a power calculation software tool running in the computer or processor;
   feeding the transition activity data to the power calculation software tool; and
   calculating static and dynamic power consumed by at least a portion of the logic design using the design hierarchy information and the number of state transitions and the duty cycle for each of the logic gates and the registers in the logic design that was collected during said first sample period, wherein the static and dynamic power is calculated by the power calculation software tool; and
   changing the logic design to optimize power consumption.

2. The method of claim 1 further comprising:
   running the application software on the logic design being emulated in the hardware logic emulation system during a second sample period, the second sample period comprising a first predetermined number of clock cycles;
   collecting a number of state transitions between logic level high and logic level low and duty cycle for each logic gate and register in the logic design for state transitions taking place during the second sample period;
   calculating static and dynamic power consumed by at least the portion of the logic design using the number of state transitions and the duty cycle collected during said second sample period; and
   plotting power consumption calculated for said first sample period and said second sample period on a graph, thereby displaying the static and dynamic power consumed by the emulated logic design.

3. The method of claim 1 wherein each of the plurality of integrated circuits comprise a programmable logic device.

4. The method of claim 1 wherein each of the plurality of integrated circuits comprise a processor chip.

5. The method of claim 1 wherein the application software is software that will run in a target system including the logic design after the logic design is fabricated.

6. A method for calculating power consumption of a logic design by using a computer or a processor, the method comprising:

programming the logic design into a hardware logic emulation system comprised of a plurality of interconnected programmable integrated circuits;
defining a power event, said power event defined by a triggering condition comprising predetermined logic states for specified nodes in the logic design;
defining a sampling window, said sampling window comprising a plurality of segments, each of said segments defining how many cycles of a clock driving the logic design for which circuit transition data for each logic gate and register in the logic design will be collected;
emulating the logic design in the hardware logic emulation system;
running application software on the logic design being emulated in the hardware logic emulation system during the plurality of segments;
when said power event occurs during the emulation of the logic design, collecting state transition activity data wherein the state transition activity data comprises a number of state transitions and duty cycle for each logic gate and register in the logic design during each of said plurality of segments, wherein state transitions comprise transitions between logic level high and logic level low;
feeding design hierarchy information of the logic design to a power calculation software tool running in the computer or processor;
feeding the transition activity data to the power calculation software tool;
calculating static and dynamic power consumed by at least a portion of the logic design using the design hierarchy information, the state transition activity data and the duty cycle collected during each of said plurality of segments, wherein the static and dynamic power is calculated by the power calculation software tool; and
plotting static and dynamic power consumption calculated for each of said plurality of segments on a graph, thereby displaying power consumed by the logic design; and
changing the logic design to optimize power consumption.

7. The method of claim 6 wherein each of the plurality of integrated circuits comprise a programmable logic device.

8. The method of claim 6 wherein each of the plurality of integrated circuits comprise a processor chip.

9. The method of claim 6 wherein the application software is software that will run in a target system including the logic design after the logic design is fabricated.

10. A method for calculating power consumption of a logic design by using a computer or a processor, the method comprising:
programming the logic design into a hardware logic emulation system comprised of a plurality of interconnected programmable integrated circuits;
emulating the logic design in said hardware logic emulation system;
running application software on the logic design being emulated in the hardware logic emulation system during a power evaluation period;
collecting state transition activity data for each logic gate and register in the logic design while the logic design is emulated over the power evaluation period, wherein the state transition activity data comprises a number of state transitions and duty cycle for each logic gate and register in the logic design during the power evaluation period, and wherein state transitions comprise transitions between logic level high and logic level low;
dividing said power evaluation period into a plurality of windows, wherein each of said plurality of windows is defined by a predetermined number of segments, each of said segments comprising state transition activity data for a number of clock cycles taking place during a time period while the logic design was run in said hardware logic emulation system;
feeding design hierarchy information of the logic design to a power calculation software tool running in the computer or processor;
feeding the transition activity data to the power calculation software tool;
calculating static and dynamic power consumed by at least a portion of the logic design using the design hierarchy information and the state transition activity data and the duty cycle for each of said segments, wherein the static and dynamic power is calculated by the power calculation software tool;
plotting static and dynamic power consumption calculated for each of said plurality of segments on a graph, thereby displaying power consumed by the logic design; and
changing the logic design to optimize power consumption.

11. The method of claim 10 wherein during periods of low power consumption, said windows have fewer segments than during periods of higher power consumption.

12. The method of claim 10 wherein during periods of high power consumption, said windows have more segments than during periods of low power consumption.

13. The method of claim 10 wherein said windows are comprised of segments that collect the transition activity data for a smaller number of clock cycles so a user can see power consumption for a smaller period of time at higher resolution.

14. The method of claim 10 wherein each of the plurality of integrated circuits comprise a programmable logic device.

15. The method of claim 10 wherein each of the plurality of integrated circuits comprise a processor chip.

16. The method of claim 10 wherein the application software is software that will run in a target system including the logic design after the logic design is fabricated.

17. A method for calculating power consumption of a logic design by using a computer or a processor, the method comprising:
programming the logic design into a hardware logic emulation system comprised of a plurality of interconnected programmable integrated circuits;
emulating the logic design in said hardware logic emulation system;
running application software on the logic design being emulated in the hardware logic emulation system during a sample period;
identifying a predetermined operation of the logic design, the predetermined operation having a higher power consumption probability;
providing an adjustable time scale that defines a number of cycles of a clock driving the logic design for which state transition activity data for each logic gate and register in the logic design will be collected during the sample period, the state transition activity data comprising a number of state transitions and duty cycle for each logic gate and register in the logic design during the sample period, where state transitions comprise transitions between logic level high and logic level low, the number of the clock cycles driving the logic design during the predetermined operation being greater than the number of the clock cycles driving the logic design during other logic circuit operations;
collecting said state transition activity data in accordance with the adjustable time scale;

feeding design hierarchy information of the logic design to a power calculation software tool running in the computer or processor;

feeding the state transition activity data to the power calculation software tool; and calculating static and dynamic power consumed by at least a portion of the logic design using the design hierarchy information and the state transition activity data and the duty cycle collected during the sample period, wherein the static and dynamic power is calculated by the power calculation software tool; and changing the logic design to optimize power consumption.

18. The method of claim 17 wherein each of the plurality of integrated circuits comprise a programmable logic device.

19. The method of claim 17 wherein each of the plurality of integrated circuits comprise a processor chip.

20. The method of claim 17 wherein the application software is software that will run in a target system including the logic design after the logic design is fabricated.

21. A method for calculating power consumption of a logic design by using a computer or a processor, the method comprising:

programming the logic design into a hardware logic emulation system comprised of a plurality of interconnected programmable integrated circuits;

providing a variable sampling rate that defines a number of cycles of a clock driving the logic design for which state transition activity data for each logic gate and register in the logic design will be collected during a sample period, the state transition activity data comprising a number of state transitions and duty cycle for each logic gate and register in the logic design during the sample period, where state transitions comprise transitions between logic level high and logic level low, and the sampling rate applied during a high power operation of the logic design being greater than the sampling rate applied during a low power operation;

emulating the logic design in said hardware logic emulation system;

running application software on the logic design being emulated in the hardware logic emulation system during the sample period;

collecting said state transition activity data in accordance with the variable sampling rate;

feeding design hierarchy information of the logic design to a power calculation software tool running in the computer or processor;

feeding the transition activity data to the power calculation software tool; and calculating static and dynamic power consumed by at least a portion of the logic design using the design hierarchy information and the state transition activity data and the duty cycle collected during each of the sample period, wherein the static and dynamic power is calculated by the power calculation software tool; and changing the logic design to optimize power consumption.

22. The method of claim 21 wherein each of the plurality of integrated circuits comprise a programmable logic device.

23. The method of claim 21 wherein each of the plurality of integrated circuits comprise a processor chip.

24. The method of claim 21 wherein the application software is software that will run in a target system including the logic design after the logic design is fabricated.

25. A method for calculating power consumption of a logic design by using a computer or a processor, the method comprising:

defining an event, said event defined by a triggering condition comprising predetermined logic states for specified nodes in the logic design;

defining a sampling window, said sampling window comprising a plurality of segments, each of said segments defining how many cycles of a clock driving the logic design for which transition activity data for each logic gate and register in the logic design will be collected, the state transition activity data comprising a number of state transitions and duty cycle for each logic gate and register in the logic design during the power evaluation period, where state transitions comprise transitions between logic level high and logic level low;

emulating the logic design in a hardware logic emulation system comprised of a plurality of interconnected programmable integrated circuits;

running application software on the logic design being emulated in the hardware logic emulation system during the plurality of segments;

when said event occurs during the emulation of the logic design, collecting said state transition activity data;

feeding design hierarchy information of the logic design to a power calculation software tool running in the computer or processor;

feeding the transition activity data to the power calculation software tool; and calculating static and dynamic power consumed by at least a portion of the logic design using the design hierarchy information and the state transition activity data and the duty cycle collected during each of said plurality of segments, wherein the static and dynamic power is calculated by the power calculation software tool; and changing the logic design to optimize power consumption.

26. The method of claim 25 wherein each of the plurality of integrated circuits comprise a programmable logic device.

27. The method of claim 25 wherein each of the plurality of integrated circuits comprise a processor chip.

28. The method of claim 25 wherein the application software is software that will run in a target system including the logic design after the logic design is fabricated.

29. A method for calculating a selected characteristic of a logic design by using a computer or a processor, the method comprising:

defining a predetermined event, said predetermined event defined by a triggering condition comprising predetermined logic states for specified nodes in the logic design;

defining a sampling window, said sampling window comprising a plurality of segments, each of said defining how many cycles of a clock driving the logic design for which state transition activity data for each logic gate and register in the logic design will be collected, the state transition activity data comprising a number of state transitions and duty cycle for each logic gate and register in the logic design during the power evaluation period, where state transitions comprise transitions between logic level high and logic level low;

running application software on the logic design being emulated in the hardware logic emulation system during the sampling window;

emulating the logic design in a hardware logic emulation system comprised of a plurality of interconnected programmable integrated circuits;

when said predetermined event occurs during the emulation of the logic design, collecting said state transition activity data;

feeding design hierarchy information of the logic design to a software tool running in the computer or processor;

feeding the transition activity data to the software tool;

calculating the selected characteristic of at least a portion of the logic design using the design hierarchy information and the state transition activity data and the duty cycle collected during each of the plurality of samples, wherein the selected characteristic is calculated by the software tool;

displaying a waveform of the selected characteristic of the logic design; and changing the logic design to optimize power consumption.

30. The method of claim 29, wherein the selected characteristic is power consumed by the logic design.

31. The method of claim 29 wherein each of the plurality of integrated circuits comprise a programmable logic device.

32. The method of claim 29 wherein each of the plurality of integrated circuits comprise a processor chip.

33. The method of claim 29 wherein the application software is software that will run in a target system including the logic design after the logic design is fabricated.

34. An apparatus for calculating power consumption of a logic design comprising:

a processor running a power calculation software tool; and an interface receiving:

i) transition activity data produced using a number of state transitions and duty cycle from a hardware logic emulation system, and ii) design hierarchy information of the logic design from the hardware logic emulation system;

wherein the hardware logic emulation system is comprised of a plurality of interconnected programmable integrated circuits and emulates the logic design for application software running on the emulated logic design, wherein the hardware logic emulation system collects the number of state transitions between logic level high and logic level low and the duty cycle for each logic gate and register in the logic design for state transitions taking place during a sample period of the application software running on the emulated logic design, said sample period comprising a predetermined number of clock cycles, wherein the power calculation software tool calculates static and dynamic power for the software application running on the emulated logic design during the sample period consumed by at least a portion of the logic design using the design hierarchy information and the number of state transitions and the duty cycle for each of the logic gates and the registers in the logic design that was collected during said sample period changing the logic design to optimize power consumption.

35. The method of claim 34 wherein the application software is software that will run in a target system including the logic design after the logic design is fabricated.

* * * * *